(12) United States Patent
Van Os et al.

(10) Patent No.: US 10,758,079 B2
(45) Date of Patent: Sep. 1, 2020

(54) COFFEE BEAN PACKAGE FOR DISPENSING A DOSE OF COFFEE BEANS

(75) Inventors: Ivo Van Os, Utrecht (NL); Gerbrand Kristiaan de Graaff, Hillegom (NL); Philippe Jacques van Camp, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/253,824

(22) Filed: Oct. 5, 2011

(65) Prior Publication Data
US 2012/0118165 A1 May 17, 2012

Related U.S. Application Data

(63) Continuation of application No. PCT/NL2010/050170, filed on Apr. 1, 2010.

(30) Foreign Application Priority Data

Apr. 6, 2009 (NL) .................................. 2002722

(51) Int. Cl.
*A47J 31/42* (2006.01)
*A47J 42/50* (2006.01)
(Continued)

(52) U.S. Cl.
CPC ............. *A47J 31/42* (2013.01); *A47J 36/022* (2013.01); *A47J 42/50* (2013.01); *B65D 83/0409* (2013.01); *B65D 83/0427* (2013.01); *G01F 11/24* (2013.01); *G01F 11/46* (2013.01); *G01F 15/06* (2013.01)

(58) Field of Classification Search
CPC .......... A47J 31/42; A47J 36/022; A47J 42/50; G01F 15/06; G01F 11/24; G01F 11/46; B65D 83/0427; B65D 83/0409
USPC .................. 426/115, 79, 119, 594, 595, 394; 220/555, 553; 206/533, 539, 538;
(Continued)

(56) References Cited

U.S. PATENT DOCUMENTS 1,141,368 A * 6/1915 Travis ................... G01F 11/261
222/456
1,155,323 A * 9/1915 McBroom ............. G01F 11/261
222/456
(Continued)

FOREIGN PATENT DOCUMENTS

DE 2822581 * 11/1979
EP 0409759 * 1/1991
(Continued)

OTHER PUBLICATIONS

Translation of FR 2755431.*
(Continued)

*Primary Examiner* — Ibrahime A Abraham
*Assistant Examiner* — Frederick F Calvetti
(74) *Attorney, Agent, or Firm* — Foley & Lardner LLP

(57) ABSTRACT

Coffee bean package provided with an inner space for holding a collection of coffee beans for multiple portions of coffee beverage, which inner space is surrounded by at least one wall, a coffee bean outlet for dispensing coffee beans from the inner space, and a dosing device which is arranged for dispensing coffee beans from the inner space in a predetermined dose.

11 Claims, 21 Drawing Sheets

(51) Int. Cl.
*G01F 15/06* (2006.01)
*B65D 83/04* (2006.01)
*G01F 11/24* (2006.01)
*G01F 11/46* (2006.01)
*A47J 36/02* (2006.01)

(58) Field of Classification Search
USPC .............. 99/286, 289 R; 222/325, 452, 516, 222/367–369, 160, 1
See application file for complete search history.

(56) References Cited

U.S. PATENT DOCUMENTS

| | | | |
|---|---|---|---|
| 1,183,111 A * | 5/1916 | Pettermann et al. ....................... B01F 13/1058 222/144 |
| 1,424,682 A * | 8/1922 | Schlosser ................ A47J 47/01 222/144 |
| 1,640,156 A * | 8/1927 | Peterman ............... A47G 19/34 222/437 |
| 2,025,821 A * | 12/1935 | Nordmarken ........... G01F 11/24 222/284 |
| 2,054,743 A * | 9/1936 | Fend ....................... B65D 83/06 222/368 |
| 2,088,836 A * | 8/1937 | Brown ..................... G01F 11/24 222/284 |
| 2,190,092 A * | 2/1940 | Bailey .................... A47G 19/34 222/158 |
| 2,575,967 A * | 11/1951 | May .................................. 222/39 |
| 2,881,955 A * | 4/1959 | Lambert ................... A47K 5/10 222/181.2 |
| 3,146,921 A | 9/1964 | Brady |
| 3,574,411 A * | 4/1971 | Miller ................ B65G 53/4633 222/365 |
| 3,648,900 A * | 3/1972 | Voigt ..................... A47G 19/34 222/168.5 |
| 4,079,860 A * | 3/1978 | Maves .................... G01F 11/24 222/306 |
| 4,109,830 A * | 8/1978 | Zeigler ................. G01F 11/261 222/143 |
| 4,154,365 A * | 5/1979 | Lorca ..................... B65D 83/04 206/536 |
| 4,562,940 A * | 1/1986 | Asphar ..................... B67B 7/28 222/88 |
| 4,710,067 A * | 12/1987 | Salley ................ B65G 53/4633 406/64 |
| 4,961,521 A * | 10/1990 | Eckman ................. A47G 19/24 128/203.15 |
| 5,054,657 A * | 10/1991 | Morse et al. .................. 222/162 |
| 5,129,561 A * | 7/1992 | Drobish ................ G01F 11/262 222/455 |
| 5,186,366 A * | 2/1993 | Meisner ................. A47G 19/34 222/158 |
| 5,292,037 A * | 3/1994 | Held ............................ 222/339 |
| 5,324,143 A * | 6/1994 | Sanders ............. B65G 53/4633 406/67 |
| 5,421,491 A * | 6/1995 | Tuvim et al. ................. 222/336 |
| 5,547,109 A * | 8/1996 | Robbins, III ...... B65D 47/0814 220/254.3 |
| 5,622,099 A * | 4/1997 | Frei ................................ 99/287 |
| 5,791,515 A * | 8/1998 | Khan et al. ................... 221/154 |
| 5,791,526 A * | 8/1998 | Landais et al. ............ 222/185.1 |
| 5,897,025 A * | 4/1999 | Flewitt ............... B65D 83/0409 206/537 |
| 5,931,302 A * | 8/1999 | Isaacs et al. .................. 206/538 |
| 5,947,329 A * | 9/1999 | Bailey ................ B65D 83/0409 221/288 |
| 5,947,336 A * | 9/1999 | Thompson ............... 222/153.13 |
| 5,971,216 A * | 10/1999 | Robbins, III ......... G01F 11/262 222/158 |
| 6,029,828 A * | 2/2000 | Robbins et al. ................. 211/78 |
| 6,062,438 A * | 5/2000 | Ellis ........................ A47F 1/035 198/671 |
| 6,079,314 A * | 6/2000 | Mackinnon .................. 99/289 R |
| 6,095,032 A * | 8/2000 | Barnett et al. .................. 99/286 |
| 6,131,765 A * | 10/2000 | Barry ...................... A47F 1/035 221/264 |
| 6,189,742 B1 * | 2/2001 | Thomson ............... A47G 19/34 141/174 |
| 6,264,068 B1 * | 7/2001 | Ours ...................... A47G 19/02 222/129 |
| 6,279,788 B1 * | 8/2001 | Lillelund ................ A47J 47/04 222/481 |
| 6,293,440 B1 * | 9/2001 | Weaver ................. G01F 11/263 222/363 |
| 6,339,985 B1 * | 1/2002 | Whitney ........................ 99/286 |
| 6,581,511 B2 * | 6/2003 | Cusenza et al. ................. 99/357 |
| 7,856,921 B2 * | 12/2010 | Arrick et al. ................... 99/295 |
| 8,087,531 B1 * | 1/2012 | Riemer .................. B65D 47/06 215/387 |
| 9,163,970 B2 * | 10/2015 | Antal, Sr. ............... G01F 11/06 |
| 9,494,456 B2 * | 11/2016 | Watson .................. B65D 25/52 |
| 9,585,503 B2 * | 3/2017 | Watson .................... B23P 19/00 |
| 2003/0071070 A1 * | 4/2003 | Jouve ........................... 222/205 |
| 2006/0027609 A1 * | 2/2006 | Landau et al. ................ 222/434 |
| 2007/0257142 A1 * | 11/2007 | Chapman ...................... 241/92 |
| 2007/0262097 A1 * | 11/2007 | Antal ..................... G01F 11/261 222/456 |
| 2008/0290110 A1 * | 11/2008 | Gelardi .............. B65D 83/0409 221/266 |
| 2009/0145302 A1 * | 6/2009 | Dutertre et al. ............. 99/289 R |
| 2010/0308141 A1 * | 12/2010 | Bich ............................. 241/30 |
| 2010/0320236 A1 * | 12/2010 | Hassan .................. A47G 19/34 222/368 |
| 2011/0256273 A1 * | 10/2011 | de Graaff et al. ............. 426/112 |
| 2012/0298259 A1 * | 11/2012 | Gronholm ............... G01F 11/24 141/369 |
| 2014/0291357 A1 * | 10/2014 | Antal, Sr. ............ B65D 17/502 222/454 |
| 2014/0312075 A1 * | 10/2014 | Antal, Sr. ............... G01F 11/06 222/464.1 |
| 2015/0330824 A1 * | 11/2015 | Watson .................. B65D 25/52 222/438 |
| 2016/0123786 A1 * | 5/2016 | Hanna ................... B65D 47/06 222/454 |

FOREIGN PATENT DOCUMENTS

| | | | |
|---|---|---|---|
| EP | 1 345 514 B1 | | 1/2005 |
| EP | 1345514 | * | 1/2005 |
| EP | 2 612 578 | | 7/2013 |
| FR | 1289650 | * | 4/1962 |
| FR | 1336874 | * | 9/1963 |
| FR | 2046439 | | 3/1971 |
| FR | 2755431 | * | 5/1998 |
| FR | 2956303 | * | 8/2011 |
| GB | 158960 | * | 2/1921 |
| GB | 719054 | * | 11/1954 |
| GB | 736834 | * | 9/1955 |
| JP | 47-021270 | | 10/1972 |
| JP | 58-137719 | | 8/1983 |
| JP | S58-137719 A | | 8/1983 |
| JP | H03-3166 | | 1/1991 |
| JP | 11-155737 | | 6/1999 |
| JP | 2002-219055 | | 8/2002 |
| JP | 2004-329411 | | 11/2004 |
| WO | WO0245555 | * | 6/2002 |
| WO | WO2006090183 | * | 8/2006 |
| WO | WO-2010/033023 A2 | | 3/2010 |

OTHER PUBLICATIONS

Translation of EP 1345514 with reference.*
Examination Report for European Application No. 10711939.8, dated Jan. 29, 2014, 6 pages.
International Search Report for PCT/NL2010/050170, dated Nov. 17, 2010, 6 pages.
Notification of Reasons for Refusal for Japanese Patent Application No. 2012-504639 and English Translation, dated Feb. 28, 2014, 9 pages.

(56) References Cited

OTHER PUBLICATIONS

English-language machine translation of JP 2002219055, Sanyo Electric Co. (Aug. 6, 2002).
English-language machine translation of JP 2004329411, Nippon Itomic Co. Ltd. (Nov. 25, 2004).
English-language machine translation of Abstract of JP H03-3166, Tokyo Shibaura Electric Co. (Jan. 17, 1991).

* cited by examiner

COFFEE BEAN PACKAGE FOR DISPENSING A DOSE OF COFFEE BEANS

CROSS-REFERENCE TO RELATED APPLICATIONS

The present application is a continuation application of International Patent Application Serial No. PCT/NL2010/050170 filed on Apr. 1, 2010; which claimed priority to The Netherlands Application No. NL2002722 filed on Apr. 6, 2009. Both applications are hereby incorporated herein by reference in their entireties.

BACKGROUND

The invention concerns a coffee bean package provided with an inner space for holding a collection of coffee beans for multiple portions of coffee beverage, which inner space is at least partly surrounded by at least one wall, and a coffee bean outlet for dispensing coffee beans from the inner space.

The invention further concerns a method for dispensing a dose of coffee beans to a grinder, wherein a collection of roasted and possibly quenched and/or sprayed coffee beans during a packaging process are packaged in a coffee bean package, such that exposure of the coffee beans to ambient air is prevented.

Existing coffee makers are for instance filter coffee makers and espresso machines. In the case of filter coffee makers, an amount of ground coffee is placed in a filter, after which hot water is poured onto the ground coffee. Upon the water passing the ground coffee, the ground coffee is extracted and a coffee beverage is obtained after which the coffee beverage, also referred to as filter coffee, flows through the filter while the coffee residues are left behind in the filter. It is customary for the hot water to flow through the ground coffee and the filter with the aid of gravity. After the hot water that corresponds with the amount of desired coffee beverage has been poured out over the ground coffee and has passed through the filter, the filter, at least if it is a disposable filter, can be thrown away with the ground coffee residue. Such a disposable filter typically consists substantially of paper. Also known are filters which are designed to be used more than once. After use, these filters are, for instance, cleaned, so that they can be filled with a next portion of ground coffee for preparing a new coffee beverage with the same filter.

In coffee making by means of espresso machines, also a filter is provided for holding an amount of ground coffee. Here, under a relatively high pressure, hot water is forced through the ground coffee and the filter. The coffee beverage thereby obtained generally has a higher dry matter content than filter coffee and typically has a stronger concentration of coffee extracts than filter coffee, at least given a comparable amount of ground coffee and supplied water. Typically, a metal filter is used.

Coffee beverage can be obtained in a known manner also with the aid of a percolator. In certain machines, such as, for instance, the Senseo® coffee machine of the producers Douwe Egberts® and Philips®, for instance a paper disposable filter and a metal filter holder are used. Further known is instant coffee, where coffee concentrate or freeze-dried coffee is dissolved in hot water. In this latter method, no filter at all is used.

If a relatively long time has elapsed between the grinding of the coffee beans and the preparation of the coffee beverage with the ground coffee, there is a chance that a part of the flavor and aromas given by coffee beans is lost. Without wishing to be bound to any theory, it may be that the larger total surface of the particles of the ground coffee together, compared with the joint surface of unground coffee beans of the same weight, causes relatively more exchange between the surface and the ambient air than the total surface of the coffee beans, which can adversely affect the taste and odor of the coffee beverage. In current machines with grinders, the coffee beans are for that reason ground a short time before the preparation of the coffee beverage.

Incidentally, it may also be that flavors and odors connected with the coffee beans may be lost or diminish when unground coffee beans come into contact with ambient air for a long time. Generally, coffee beans and ground coffee are for that reason packaged in airtight and/or vacuum packages.

Certain coffee machines may be provided with grinders that are integrated in the coffee machine. Also, such coffee makers may be provided with coffee bean holders for feeding the coffee beans directly from the coffee bean package. Through operation of the coffee making apparatus, a part of the coffee beans from the coffee bean holder is ground, for the purpose of preparing a coffee beverage with this ground coffee. For instance, the grinder is directly operated by pressing a button, while, for instance, the number of times the button is pressed, or the length of time of pressing the button, can determine the amount of ground coffee. In automatic coffee makers with grinders, the amount of coffee beverage and the strength of the coffee beverage can be pre-selected and/or pre-set, in which case on the basis of the selected strength a dose of beans is supplied from the holder to the grinder so that an amount of coffee is obtained which, together with the predetermined amount of water, can result in a desired amount of coffee beverage of a desired strength.

Disadvantages of the above-mentioned principles can be that an amount of coffee beans is present in the coffee maker for a long time before it is ground, in that a complete pack of coffee beans is emptied into the coffee bean holder. This can adversely affect the taste and odor of the coffee beverage prepared with these coffee beans.

Also, in and around the grinder of existing coffee makers there are typically residues left of the preceding grinding runs. Study has shown that in conventional grinders typically 3-10 grams of one or more previous grinding runs are left behind in the grinder. These remainders of a previous grinding run may subsequently be entrained in a new grinding run, which can affect the taste of the coffee beverage. Moreover, if the coffee maker is filled with new coffee beans whose taste differs from the previous filling, the remainders of the previous filling may possibly be mixed with the ground coffee of the new coffee beans, so that not the desired taste inherent to the new coffee beans can be obtained. This may be disadvantageous in particular if the user regularly wishes to change the type of coffee beans. In conventional coffee makers, the user can circumvent this problem only by dosing the coffee bean holder in each case with a small amount of coffee beans. A disadvantage involved here, however, is that the coffee bean package then is not entirely emptied into the coffee maker and is left partly filled, so that the remaining coffee beans come into contact with ambient air. Typically, the coffee beans then are stored in the meantime in a separate, preferably airtight holder, such as an airtightly closable pot or tin. These holders, however, can take up relatively much space.

In the current state of the art, after grinding and making the coffee beverage, either ground coffee is left behind in the coffee maker or coffee beans are left behind in the coffee maker. The coffee bean package and/or the coffee bean holder are not wholly emptied, so that coffee beans are left behind in the package and/or holder. There is moreover no system that allows regularly changing taste of freshly ground coffee in an efficient and convenient manner.

SUMMARY

An object of the invention is to obviate at least one of the above-mentioned disadvantages and/or other disadvantages.

In the following description, that the coffee beans or ground coffee remain preserved or package-fresh may be understood to mean that the taste, aromas and/or volatile components of the coffee beans or ground coffee remains relatively preserved. Package-fresh in this description may additionally be understood to mean the particular condition of coffee beans shortly after the package has been opened. This package has preferably been applied in a packaging process preferably right after roasting of the coffee beans. The package is preferably airtight and/or vacuumized so that the coffee beans can be preserved better. A particular 'kind' of coffee beans may be understood to mean that the kind in question pertains to a specific coffee bean-related taste, composition of aromas and volatile components of the coffee beans, or to a particular mix, composition or blend of coffee beans, preferably as stated on the package. If in this description different kinds of coffee beans are described, it may be understood that the related taste, aromas, mix, composition or blends are different. Unless stated otherwise, in this description coffee beans are understood to be roasted coffee beans, or at least coffee beans which are to be ground for obtaining ground coffee beans for preparing coffee. A predetermined dose in this description may for instance be understood to mean that the dose has been set beforehand, for instance by a configuration of a circuit or mechanical system of the coffee maker determined during manufacture, or that the dose has been set by the user just prior to coffee making.

In a first aspect, the invention provides a coffee bean package according to claim 1.

The coffee bean package may be provided with a dosing device which is arranged for dispensing a predetermined dose of coffee beans. The dosing device can contribute to the purpose of allowing not more and not less than approximately a predetermined dose of coffee beans to be supplied to the grinder, while a residual amount of coffee beans can remain behind in the package, unless a last amount of coffee beans in the package is involved, which last amount is less than the predetermined dose. Preferably, the predetermined dose forms a part of the total amount of coffee beans in the inner space of the package. The coffee beans can for instance after roasting be packaged in the package and upon use be supplied directly from the package in a dosed manner to a coffee bean grinder.

The dosing device can for instance comprise a scoop or trough or the like, arranged for holding a particular volume and/or weight of coffee beans. The at least one wall can comprise at least a circumferential wall and a bottom. Preferably, also a top wall is provided, so that the package can be wholly closed.

One of the insights that could lead to the invention is that it is possible to arrange the dosing device for dosing coffee beans to a coffee bean grinder in the coffee bean package. In existing systems the dosing device is present in the coffee making apparatus. With the invention, the predetermined dose of coffee beans can in principle be supplied directly from the package to the grinder. This can be of benefit to the taste of the coffee beverage. Moreover, directly a coffee kind as desired can be prepared. Through the coffee bean package according to the invention, separate coffee bean holders, in addition to the coffee bean package, can become redundant. The apparatus may for instance be provided with a connecting device for connecting the coffee bean package to the apparatus. Incidentally, the invention can optionally be used with apparatuses with grinders that do have coffee bean holders.

Before the coffee bean package has been opened a first time for consumption, it can be closed to prevent contact between the coffee beans and ambient air, for instance through a seal or closing foil. For instance, the package is closed off substantially airtightly and/or vacuumized.

An apparatus provided with a coffee bean grinder can for instance involve a coffee bean grinder separate from the coffee making apparatus, or a coffee making apparatus provided with a coffee bean grinder.

In an embodiment, the package is provided with a movable dosing device, which can for instance be controlled by the apparatus, while for instance multiple dosages can be passed out of the package. For separating a dose of coffee beans from the collection of coffee beans in the package, the dosing device can for instance comprise a scoop. In use, the coffee bean package and/or the scoop may be set up movably, for instance with respect to the apparatus, for moving the scoop through the collection of coffee beans, so that a dose of coffee beans can be scooped from the collection. Furthermore, the scoop can dispense the loaded dose of coffee beans through the coffee bean outlet, for supplying the dose of coffee beans to the grinder.

The scoop can be provided with a loading wall for separating coffee beans in the scoop with respect to coffee beans in the package, and for guiding and supporting beans in the scoop. The loading wall may be arranged to surround one predetermined dose of coffee beans. The loading wall may be arranged to guide the coffee beans from the scoop through the outlet. The loading wall may comprise a dosing edge for determining the upper surface of the loaded dose of coffee beans. Upon filling of the scoop, an excess of coffee beans can project above the dosing edge, and fall out of the scoop. The height and/or width of the dosing edge can determine the accuracy of the dose.

In an embodiment, the loading wall can extend from the outlet up to, or beyond, the dosing edge of the scoop along a curve. The coffee beans can slide along the curve. Initially the beans will be guided over the dosing edge along the loading wall. In a later stage the beans will slide along the loading wall through the outlet. The loading wall can moreover be provided with a carrying wall part which extends beyond the dosing edge. The loading wall can merge smoothly into the carrying wall part, and extends as one integral wall part beyond the dosing edge. The carrying wall part can carry coffee beans from the package and guide them over the dosing edge. The loading wall can moreover be provided with a scoop bottom which extends at least partly approximately parallel to the circumferential wall of the package.

The scoop may be fixed with respect to the outlet and/or the bottom and/or the wall of the package. In an embodiment, the scoop is fixed with respect to the wall and it rotates together with the wall about a rotation axis of the package. By rotating the scoop through the coffee beans in the package, a dose of coffee beans can be loaded into the scoop. The loading wall can separate the coffee beans in the scoop from the rest of the coffee beans in the package, so that a predetermined dose can be surrounded by the scoop, in particular by the loading wall. As the outlet can have a fixed position with respect to the scoop, it is possible, once the predetermined dose of coffee beans is in the scoop, separately from the rest of the coffee beans, to release the outlet so that the beans can be dispensed through the outlet.

In an embodiment, the scoop may be fastened to a wall of the package, for instance to a bottom and/or to a circumferential wall of the package. The scoop can for instance be fixed with respect to the wall, while in use the wall and/or the whole package is moved, in particular rotated, for moving the scoop through the coffee beans. The outlet may for instance be fixed with respect to the scoop. The scoop can for instance have the shape of a trough, for scooping and carrying along an approximately measured amount of coffee beans. Between the scoop and the wall an opening can extend, for loading coffee beans into the scoop. The scoop can for instance be provided with a carrying wall part for sliding the coffee beans through the scoop opening, and/or the scoop may for instance move in the direction of the opening, so that the coffee beans are loaded through the opening.

Under the influence of gravity, in a use position of the package, the collection of coffee beans can continue to remain present in the package at least at the bottom, while at the top in the package there may be some empty space if the package is not completely filled. Therefore, in an embodiment, the scoop can move from the top down within the apparatus and thereby carry along a dose of coffee beans towards the empty space, where the scoop can pass the dose of coffee beans through the outlet. To this end, for instance the scoop may be arranged movably within the package and/or the package may be arranged movably within the apparatus. In a dispense position, the scoop is for instance relatively high up in the package, preferably at least partly above the top surface of the collection of coffee beans. In a loading position the scoop is for instance relatively lower down in the package, preferably at least partly below the top surface of the collection of coffee beans. Preferably, the scoop is so arranged that also the last coffee beans are carried along out of the package, while these last coffee beans, in a use position of the package, may under the influence of gravity be situated at the bottom in the package.

In an embodiment, the package is provided with closing means for closing off the coffee bean outlet. The closing means can release the outlet when the scoop is in the dispense position, so that a dose of coffee beans can be supplied through the outlet to the grinder. The outlet is preferably closed off by the closing means if the scoop is not in a dispense position. For instance, the closing means are arranged to close off the outlet if the package is uncoupled from the apparatus, and/or if the package is coupled with the apparatus but does not dispense any coffee beans. This can then prevent beans falling out of the package during or after uncoupling. Also, the coffee beans in the package may be preserved longer after uncoupling, and/or in each preparation a particular kind of coffee from a different package can be chosen. This can be especially of importance when the coffee bean package, after first being connected to a coffee making apparatus and being opened, is uncoupled from the coffee making apparatus while in the coffee package still an amount of beans is present that can be used for preparing at least one consumption of coffee beverage (for instance of a magnitude of a cup of coffee). Such a situation can arise when such a package is connected to the coffee making apparatus and a number of consumptions of coffee beverage are prepared with coffee beans from this coffee bean package, while subsequently the coffee bean package is uncoupled from the coffee machine while beans are still present in the coffee bean package that can be used for one or more consumptions of coffee beverage, in which case it is favorable that the uncoupled coffee bean package is closed. Subsequently a different coffee bean package can be connected to the coffee making apparatus for preparing a different type of coffee beverage. Different coffee bean packages can hence comprise different kinds of coffee beans and a consumer can at will alternately connect and uncouple at the coffee making apparatus different coffee bean packages that still contain beans while the uncoupled coffee bean package is closed off, which is favorable when it still contains coffee beans.

In an embodiment, the closing means can close off the coffee beans in the package so that the exposure of the coffee beans in the coffee bean package to ambient air can at least to some extent be prevented. This may be understood to mean inter alia a closure which allows at least substantially no air to pass from the environment to the beans in the package and vice versa. Preferably, the closing means can allow at least substantially no air to pass from the environment to the beans in the package and vice versa when there is a pressure difference between the space in the package in which the beans are situated and the environment that is at most 1.1, preferably 1.2, more preferably 1.3 and still more preferably 1.5 bar.

In a non-connected condition of the package, the closing means and outlet are preferably arranged fixedly with respect to each other, so that the outlet is closed off. The closing means may for instance be provided with a securing provision or the like, which fixes the closing means in closed condition. The securing provision can for instance comprise a foil or plastic breaking element or the like, which can be broken before or at a first use. Furthermore, the closing means can be moved for releasing the outlet by opening means which are arranged to operate the closing means. The apparatus may be provided with such opening means.

The closing means can for instance comprise a valve or slide. The valve or slide can comprise a passage. If the passage overlaps the outlet, the coffee beans can pass for supplying the coffee beans from the package to the grinder. The valve or slide may be arranged so that, if the passage does not overlap the outlet, the valve or slide closes off the outlet, so that the package is closed off. In an embodiment, the valve or slide is arranged rotatably relative to the outlet, so that the passage can be rotated into said overlapping position, for instance by a user or by opening means which are provided in the apparatus. The valve or slide can for instance comprise a rotary disc.

The package may be provided with a circumferential wall, and a top wall and a bottom. The circumferential wall may be circular so that the package can rotate relatively simply in the apparatus, while the circumferential wall can be guided by the apparatus. The apparatus can moreover be provided with a circular guide, at least a guide along the circumferential wall, for guiding the package when connecting and/or moving the package in the apparatus. Preferably, the package comprises one cylindrically and/or at least partly conically shaped circumferential wall. The circumferential wall, top wall and bottom are preferably relatively stiff, so that the package can retain its shape and can be connected to the apparatus relatively easily. For instance, the outlet is provided in the bottom. The closing means may be provided parallel to the bottom, while the passage may be arranged, for instance, parallel to the bottom. The valve or slide can be arranged to be rotatable relative to the bottom, so that it closes off, or releases, the outlet.

In a second aspect, the invention provides a package component according to claim 25.

The package component comprises a scoop and a bottom. The bottom is provided with an outlet opposite the scoop so that the beans can slide from the scoop through the outlet. A loading wall is arranged to guide the beans through the outlet. The package component can be connected with package walls for forming a package as already described hereinabove. Preferably, the scoop and the bottom form one integral part, being manufactured, for instance, through molding, in particular injection molding. For instance, the bottom is circular for the purpose of connecting the package component with cylindrical wall parts for forming the package. The package can also comprise, for instance, four circumferential walls at right angles to each other.

In a third aspect, the invention provides a system for dosing coffee beans according to claim 26.

In an embodiment, the package is part of a system, where, in addition to the package, there is further provided an apparatus provided with a grinder. The apparatus may be provided with a coffee bean inlet which can be connected to the coffee bean outlet of the package. Via the inlet, a dose of coffee beans can be supplied to the grinder. The apparatus comprises furthermore a connecting device so that the package can be connected to the apparatus, preferably so that the coffee bean outlet and the coffee bean inlet are connected to each other. The connecting device may be arranged for setting the dosing device into motion, in particular the package and/or the scoop. The connecting device may be arranged to have the dosing device move between a loading position and a dispense position. The movement between these positions preferably has a vertical movement component, for the purpose of scooping up the beans in the package. In an embodiment, the apparatus comprises opening means which are arranged to operate the closing means of the package for releasing and closing off the coffee bean outlet, allowing the beans to slide from the dosing device through the outlet under the influence of gravity. The opening means can rotate the closing means for aligning the passage and the outlet, such that the outlet is released.

The connecting device may be provided with a drive for driving the dosing device. For driving the dosing device, the drive may be provided with a cam. The package may be provided with an engagement element corresponding with the cam. In a condition of the package when connected to the apparatus, the cam can engage the package such that the dosing device is driven for dispensing beans. In particular, the drive can rotate the package by means of the cam, while the dosing device is fixed in the package and is also rotated for scooping up and dispensing coffee beans. For instance, the dosing device can be moved in a path along the circumference of the package. The dosing device can comprise a scoop.

Furthermore, the connecting device may be provided with a drive and a cam for respectively driving and engaging the closing means, the closing means comprising an engagement element corresponding with the cam. In this way, the drive can drive the closing means for closing off or opening the package. For instance, the drive drives on the one hand the dosing device for loading the dosing device with a predetermined dose of coffee beans, and on the other hand the closing means for releasing and closing off the outlet. Then, in one rotational direction the dosing device and/or the closing means can be driven, and in another rotational direction only the closing means. For instance, the drive can engage the closing means and rotate the package through the closing means in one rotational direction. In this rotational direction, the closing means exert for instance friction on the bottom of the package so that the closing means carry the package along in the rotating movement. If the drive rotates in the opposite rotational direction, for instance no friction or little friction is exerted, so that the closing means rotate and the package stands still.

In an embodiment, the connecting device is provided with a mechanical lock. The lock can comprise a movably arranged engagement element for engaging the package and keeping it clamped against the apparatus. The apparatus may be provided with a detector. The detector may be arranged for activating the lock if the package is connected to the connecting device. For instance, the detector comprises a spring element and/or switching element which is mechanically activated by the package. In connected condition, the package is therefore difficult to take out of the apparatus, at least not at all or difficultly so, unless a function for releasing the package is activated. Furthermore, the detector may be arranged for releasing the opening means and/or the grinder when the package is connected. Preferably, the apparatus does not work if the package is not connected.

In a use position of the package, the circumferential wall and/or the rotation axis of the package can include, for instance, an angle of between approximately 2 and 30 degrees, preferably between approximately 4 and 15 degrees, with the horizontal. In this way, the package is oriented somewhat obliquely and the coffee beans can slide along the circumferential wall in the direction of the bottom to accumulate at least near the bottom.

It may be advantageous if the scoop is so arranged that in a use position of the package, upon a complete rotation of the scoop, all coffee beans present in the package are loaded onto the scoop when only an amount of coffee beans that is less than or approximately equal to one predetermined dose is present in the package. Preferably, the apparatus is provided with a measuring device for measuring the dose dispensed through the outlet. If a dose of coffee beans is dispensed from the scoop through the outlet, it can then be determined, for extra certainty, whether the dispensed dose is approximately equal to the predetermined dose. If this is not the case, the apparatus can for instance give a signal to the user.

In a fourth aspect, the invention provides a coffee making apparatus according to claim 43.

The coffee making apparatus may be provided with a connecting device, for connecting a coffee bean package, for instance a package as described above. The connecting device can cause a part of the package to rotate, for dispensing coffee beans from the package to the grinder.

The coffee making apparatus can in principle comprise any apparatus for preparing coffee. The coffee making apparatus can for instance comprise a filter coffee making apparatus, or a coffee making apparatus arranged to supply water to ground coffee under elevated pressure. Elevated pressure may be understood to mean a pressure that is more than one atmosphere. The coffee making apparatus can for instance be an espresso machine, or for instance a coffee making apparatus working with a pressure of approximately 1-3 bar.

In a fifth aspect, the invention provides a method for dispensing a dose of coffee beans to a grinder according to claim 44.

In this method a collection of dried and/or roasted coffee beans is packaged during a packaging process in a coffee bean package, preferably such that the exposure of the coffee beans to ambient air is prevented. Also, the package may be provided with a seal or closing foil for closing off the package. For instance, the coffee beans are vacuum-packed or a gas is added to promote the shelf life of the beans in the package. The coffee bean package can for instance be supplied via a shop or directly to the end user. The user can connect the coffee bean package to an apparatus with a coffee bean grinder. In a favorable manner, a predetermined dose of coffee beans is supplied directly from the coffee bean package to the grinder, while the coffee bean package remains connected to the apparatus. After supplying the dose of coffee beans, a residual amount of coffee beans may still be present in the coffee bean package. After multiple dosages have been supplied from the package to the grinder and the package is empty, the package can be thrown away.

In an embodiment, the package is provided with an outlet which is closed off, at least unless the package is in a condition where coffee beans are dispensed to the grinder. Prior to the supply of the dose of coffee beans to the grinder, the outlet is released so that the dose of coffee beans can be dispensed to the grinder. A relatively short time after the dose of coffee beans has been fed to the grinder, the outlet can be closed off again. In this way, multiple dosages of coffee beans can be supplied to the grinder one by one from the package, while the package in the meantime can be taken off and connected again. In an embodiment, the coffee bean package, after supply of a dose of coffee beans to the grinder of the apparatus, is closed off by the apparatus, and taken off by the user.

In an embodiment, the apparatus moves the scoop through the coffee beans in the inner space of the package, so that a dose of coffee beans is carried along by the scoop, and is fed to the grinder. In a further embodiment, at least a part of the package can be rotated relative to the apparatus, so that the scoop rotates and is passed through the collection of coffee beans. During rotation the scoop can be moved in a vertical direction from the bottom to the top, for carrying along coffee beans from the collection of coffee beans in the package. The scoop then scoops up a predetermined dose of coffee beans, which dose is passed on through an outlet and/or passage to the grinder. In a dispense position of the scoop, where the beans are dispensed through the outlet and/or passage to the grinder, the upper edge of the scoop, called dosing edge in this description, is preferably situated above the level of the residual coffee beans in the package.

The package is preferably coupled with the apparatus in such a manner that the circumferential wall extends at an oblique angle with the horizontal, so that at least a part of the collection of coffee beans in the inner space lies against the bottom under the influence of gravity. When in the package there is an amount of coffee beans that is less than the predetermined dose of coffee beans, the scoop preferably carries along the complete amount of coffee beans and dispenses them to the grinder.

In an embodiment, the apparatus may be provided with a drive for driving the dosing device, in particular the scoop. The drive may be arranged such that it first rotates relative to the dosing device, until the drive during rotation engages the package so that the dosing device rotates along with the drive. The dosing device can then be rotated at least 360° for carrying along one predetermined dose of coffee beans.

BRIEF DESCRIPTION OF THE DRAWINGS

Further embodiments, effects and features of the present invention can appear inter alia from the following description, in which the invention is described in more detail on the basis of several exemplary embodiments, with reference to the appended drawings. In the drawing.

DETAILED DESCRIPTION OF EXEMPLAR EMBODIMENTS

Figure 1:
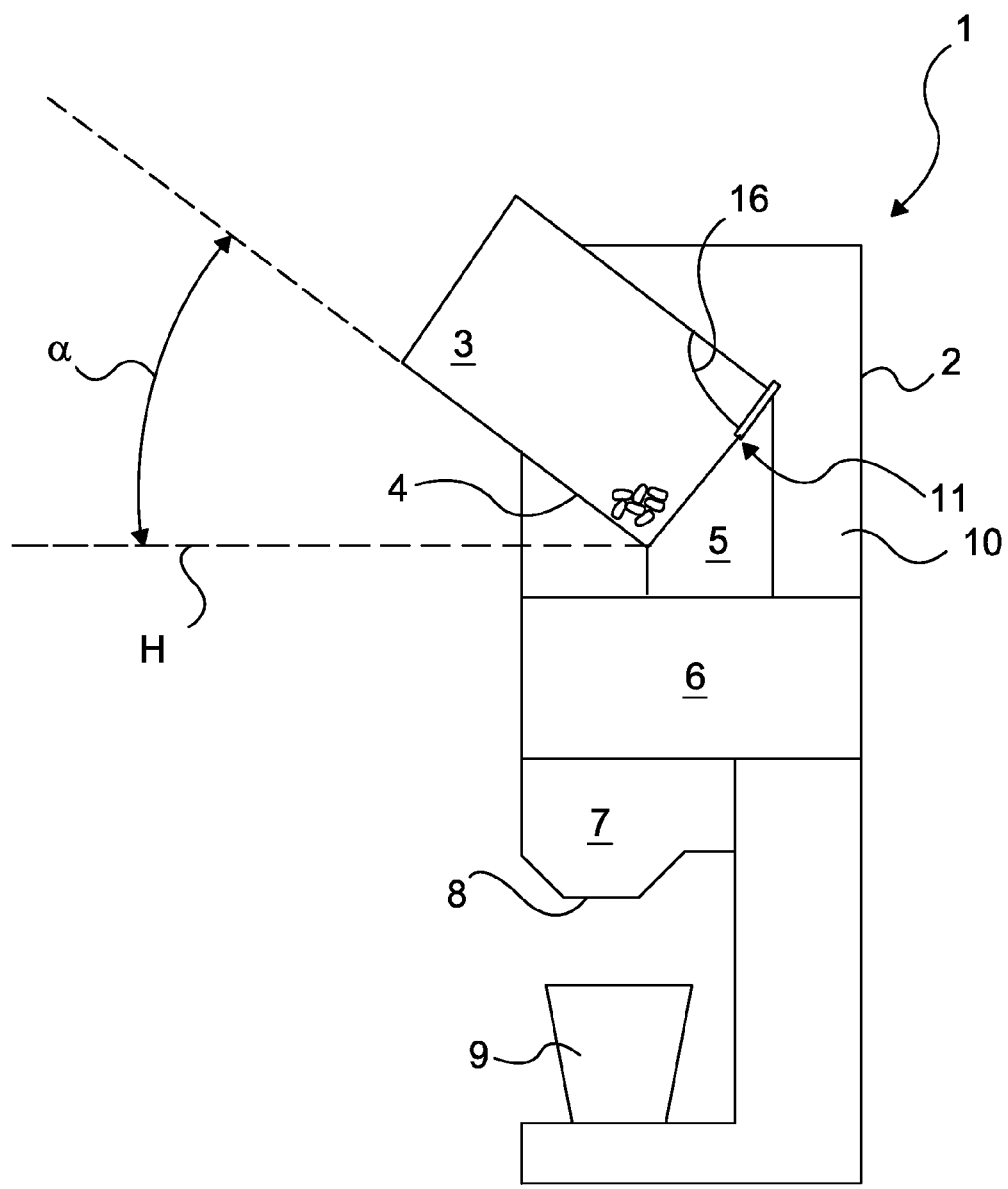
FIG. 1 shows in side elevation a schematic diagram of a cross section of a system for preparing coffee beverage.

In this description the same or corresponding parts have the same or corresponding reference numerals. In the drawing, embodiments are shown only by way of example. The elements used there are mentioned only as examples and should not be construed as limiting the invention. Also, different parts may be used within the framework of the present invention. The proportions of the embodiments shown in the figures are typically represented schematically and/or exaggeratedly and should not be construed to be limiting.

In this description, in particular reference is made to a package for coffee beans. This description, however, does not relate to just whole coffee beans. Coffee beans should be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be the case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

In FIG. 1 a system 1 for preparing coffee beverage is shown. The system comprises a coffee making apparatus 2 and a coffee bean package 3. A connecting device 4 may be provided for preferably directly connecting the coffee bean package 3 onto the coffee making apparatus 2.

The coffee bean package 3 has an inner space which at least before use may have been partly filled with the coffee beans. Preferably, the coffee bean package 3, at least before it is placed on the coffee making apparatus 2, is in itself closed off such that exposure of the coffee beans to ambient air is prevented. Preferably, to that end, the package 3 is closed off airtightly and/or vacuumized. The coffee bean package 3 can be a disposable package and/or for instance be manufactured substantially from paper and/or foil and/or cellulose and/or plastic and/or tin, while the package 3, after being emptied, can be thrown away.

The connecting device 4 may be arranged for receiving the coffee bean package 3 in whole or in part. In an embodiment, the coffee bean package 3 is for instance provided with relatively stiff guide parts, which can serve as a guide along the connecting device 4, for connecting the coffee bean package 3 to the coffee making apparatus 2. The guide parts can for instance comprise stiff walls, or an at least partly cylindrically and/or at least partly conically shaped wall, so that the coffee bean outlet 11 can be guided to the coffee bean inlet 5. For instance, the connecting device 4 and the package 3 are provided with corresponding guide parts, while the guide parts can comprise for instance screw thread, a snap connection, a bayonet closure or other connection possibility.

In an embodiment, a coffee bean inlet 5 is provided for supply of the coffee beans from the coffee bean package 3 to a grinder 6, when the package 3 is connected to the coffee making apparatus 2. In the coffee making apparatus, between the coffee bean inlet 5 and the grinder 6, a coffee bean transport path may extend. The grinder 6 is arranged for grinding the coffee beans to obtain ground coffee. The ground coffee can be supplied to a coffee preparation device 7. The coffee preparation device 7 is arranged for preparing coffee beverage, with supply of water to the ground coffee. A coffee outlet 8 is provided for dispensing the coffee beverage, preferably to a cup 9, mug, pot or thermos bottle or the like. The coffee preparation device 7 can for instance be arranged to supply hot water under pressure, as in an espresso machine, and/or be arranged as a pour-on system, as with a filter coffee maker. Also, the coffee preparation device 7 may be arranged to prepare the coffee beverage under slightly elevated pressure in the order of 1.1-2, in particular 1.1-1.5 bar. A water provision 10 may be provided for furnishing water, preferably hot water, for the preparation of coffee beverage. For heating the water, at least one heat element may be provided.

Figure 2A:
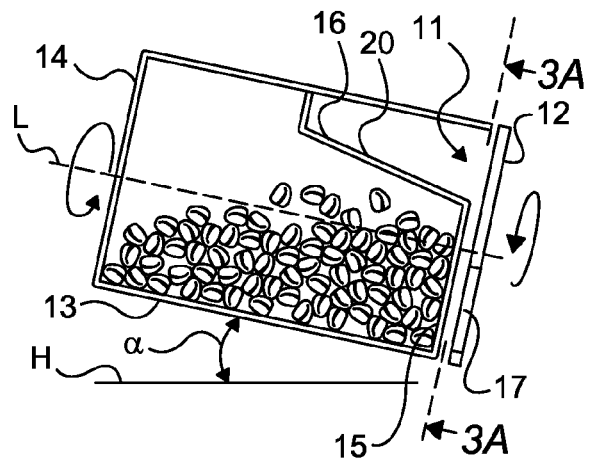
FIGS. 2A-C schematically show cross sections in side elevation of a coffee bean package in positions.
Figure 2B:
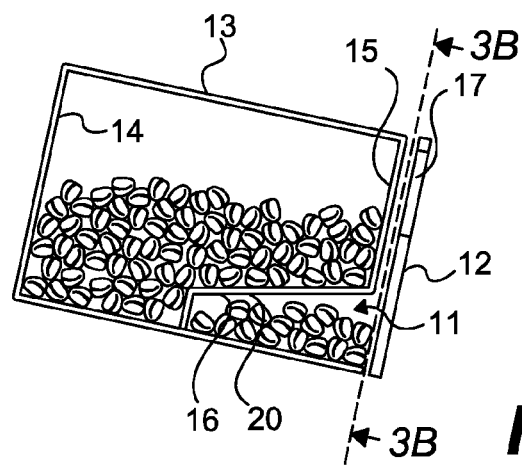
Figure 2C:
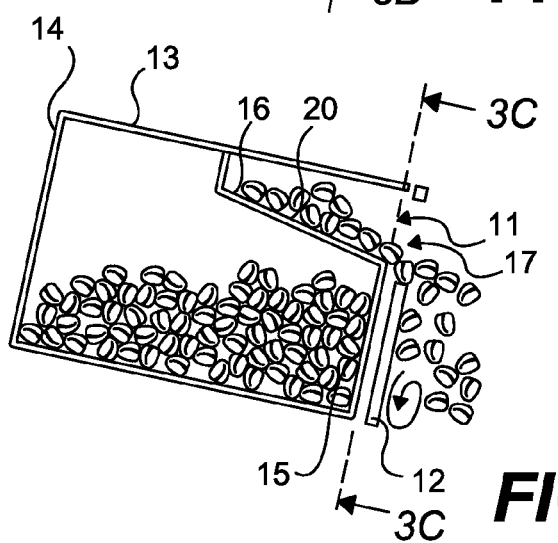
Figure 3A:
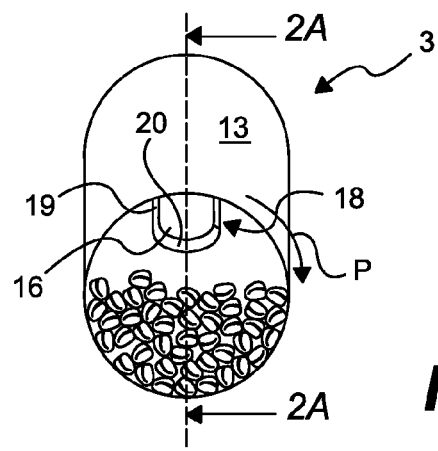
FIGS. 3A-C schematically show the cross sections in side elevation of the coffee bean package and the position of FIGS. 2A-C.
Figure 3B:
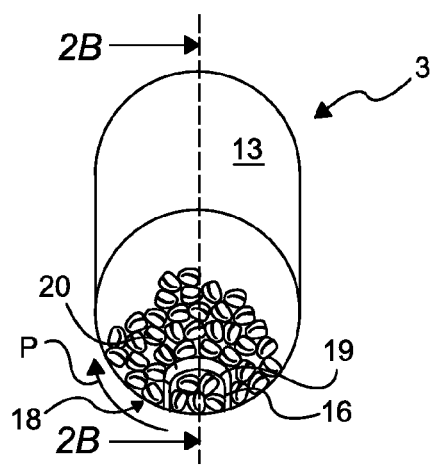
Figure 3C:
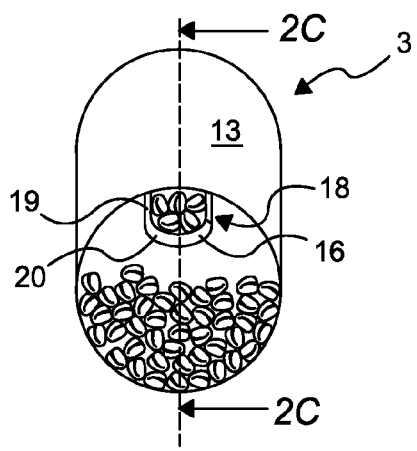

In FIGS. 2A-C, and corresponding thereto, FIGS. 3A-C, there is shown a coffee bean package 3 in three different method steps. In FIGS. 2A and 3A, the coffee bean package 3 is shown in a dispense position while the coffee bean outlet 11 is closed off by closing means 12. In FIGS. 2b and 3b the coffee bean package 3 is shown in a loading position. In FIGS. 2C and 3C the coffee bean package 3 is shown in a dispense position while the closing means 12 release the coffee bean outlet 11.

As can be seen in FIGS. 2A and 3A, a collection of coffee beans is in the inner space of the package 3. The inner space is formed by a circumferential wall 13, a top wall 14, and a bottom 15. The outlet 11 is provided in the bottom 15. In another embodiment, the outlet 11 is for instance provided in the circumferential wall 13, near the bottom 15. The package 3 is furthermore provided with a scoop 16. Also, the package 3 may be provided with above-mentioned closing means 12 for closing off the outlet 11. The closing means 12 can be designed in the form of a slide, scoop, valve or disc or the like, in particular in the form of a rotary disc, while the closing means 12 may be arranged, for instance, approximately parallel to the bottom 15 for closing off the outlet 11. The closing means 12 are provided with a passage 17, which passage can be positioned opposite the outlet 11 for passing coffee beans from the package 3.

The closing means 12 may be rotatably arranged with respect to the outlet 11, for closing off, or releasing, the outlet 11, through the positioning of the passage 17. In particular, the closing means 12 may be set up movably relative to the bottom 15. The bottom 15 may for instance be fixed with respect to the rest of the package 3, and can comprise the outlet 11. By moving, in particular rotating, the closing means 12 to a particular position, the passage 17 can overlap the outlet 11, so that coffee beans can be dispensed. By moving the closing means 12 to another position, the closing means 12 can close off the outlet 11 and/or block passage of the coffee beans. In particular, the passage 17 can then be rotated away relative to the outlet 11.

The scoop 16 may be arranged for holding one dose of coffee beans. The scoop 16 may be partly fixed to the bottom 15 and/or to the circumferential wall 13. The scoop 16 can extend for instance from the bottom 15 in the direction of the inner space. The scoop 16 is for instance partly fastened to the circumferential wall 13, while a loading opening 18 extends between the scoop 16 and the circumferential wall 13 for allowing loading of coffee beans from the collection of coffee beans in the inner space. The coffee beans can load into the scoop through the loading opening 18. The scoop 16 may be provided with a loading wall 19 against which the coffee beans are pressed upon movement of the scoop 16 through the collection of coffee beans. Also, the scoop 16 may be provided with a scoop bottom 20, for instance at least partly between the loading opening 18 and the loading wall 19, for supporting the dose of coffee beans. The scoop 16 may be provided with one or more loading walls 19, and the scoop bottom 20 may also be regarded as a second loading wall.

In the position of the closing means 12 shown in FIGS. 2A and 3A, the outlet 11 is closed off by the closing means 12, preferably so that contact of the coffee beans in the inner space with the ambient air is at least to some extent prevented. The closing means 12 can close off the package 3 substantially airtightly. As shown, the passage 17 may be situated opposite the bottom 15 of the package 3, such that the passage 17 does not overlap the outlet 11, and the closing means 12 close off the outlet 11. For instance, the rotary disc is controlled such that the outlet 11 is closed off unless the passage 17 at least partly overlaps the outlet 11. In an embodiment, the closing means 12 can for instance evacuate the outlet 11 to some extent, in cooperation with pressure regulating means (not shown), and then close it off substantially airtightly.

Furthermore, in FIGS. 2A and 3A there is shown that the package 3 may be situated, in a use position, at an angle α with respect to a horizontal H, as is also shown in FIG. 1. In a use position of the package 3 and/or in a condition when coupled with an upstanding apparatus 2 the package 3, or at least the circumferential wall 13 and/or the rotation axis L of the package 3, includes for instance an angle α of between approximately 15 and 60 degrees with the horizontal H, in particular of between approximately 20 and 40 degrees with the horizontal H. As a result, the coffee beans slide for instance in the direction of the bottom 15. Also, a last residue of coffee beans in the package 3 will be able to collect at the bottom 15. As a result, the coffee beans can be relatively easily carried along by the scoop 16, as shown in FIGS. 3A and 3B. The connecting device 4 is for instance arranged so that upon coupling of the package 3, this angular position is achieved. For instance, the guide parts of the connecting device 4 can guide the package 3 such that at least a lower part of the circumferential wall 13 includes the above-mentioned angle α, to have the coffee beans collect towards the bottom.

In FIGS. 2B and 3B, the scoop 16 is shown in a loading position. The package 3 is for instance rotated 180 degrees with respect to the position shown in FIGS. 2A and 3A, for instance about a rotation axis L of the package 3, so that the scoop 16 is at the bottom in the package 3, preferably partly under the coffee beans. The connecting device 4 may be arranged to rotate the package 3 between said dispense and loading positions. For instance, the connecting device 4 comprises a driving device for rotating the package 3. Another embodiment is for instance arranged so that the user himself can rotate the package 3, while the package 3 is received in the connecting device 4.

During rotation of the package 3, the collection of coffee beans can slide within the package 3 under the influence of gravity so that it continues to extend at the bottom in the package 3. From the position of FIGS. 2A and 3A, the scoop 16 with the loading opening 18 can move in the direction of the coffee beans, so that the coffee beans are pressed through the loading opening 18 against the loading wall 19 of the scoop 16. The outlet 11 can have a position which is fixed with respect to the scoop 16 and/or the bottom 15, and hence move along with the scoop. The outlet 11 may for instance be arranged at the dispense end of the scoop 16.

Upon the movement of the scoop 16 to the loading position, the closing means 12 can for instance move along with the scoop 16 so that the outlet 11 remains closed, as is shown in steps in FIGS. 2A and 3A and FIGS. 2B and 3B. In the loading position shown in FIGS. 2B and 3B, the passage 17 is positioned relatively high up at the bottom 15, while the outlet 11 is positioned low down at the bottom 15, so that the outlet 11 is closed off, or at least the beans are blocked.

In the position shown in FIGS. 2C and 3C the scoop 16 has been rotated approximately 180 degrees further, with respect to FIGS. 2B and 3C, so that the scoop 16 is placed in a dispense position. Upon rotation of the scoop 16 to the dispense position, the closing means 12 can be positioned such that the passage 17 overlaps the outlet 11. For instance, the closing means 12 can have remained at a standstill with respect to the previous position, while the scoop 16 rotated, as appears from FIGS. 2B and 3B with respect to 2C and 3C. Upon movement of the scoop 16 out of the collection of coffee beans in the direction of the dispense position, the dose of coffee beans is for instance chiefly supported by the scoop bottom 20. The scoop bottom 20 is then for instance at a such an angle, for instance said angle α, that the beans under the influence of gravity will slide along the scoop 16 towards the outlet 11. As can be seen in FIGS. 2C and 3C the closing means 12 are in a condition such that the outlet 11 is released, so that the dose of coffee beans can be dispensed under the influence of gravity through the outlet 11 and the passage 17 to the inlet 5 and/or the grinder 6. The whole dose of dispensed coffee beans can be passed via the inlet 5 to the grinder 6 and preferably be wholly ground, so that a next portion of coffee can make use only of package-fresh coffee beans.

After the whole dose has been passed through the passage 17, the closing means 12 can again be moved relative to the outlet 11 such that the outlet 11 is closed off. As a result, exchange of ambient air with the beans in-between two coffee bean dosages can be prevented. Also, the package 3 can be taken from the apparatus 2, without coffee beans thereby falling out of the outlet 11.

With a package 3 as described above, a predetermined dose of coffee beans can be dispensed. To this end, the package 3 is provided with a dosing device. The dosing device may be formed inter alia by the scoop 16, the outlet 11 and the closing means 12. For instance, the scoop 16 is dimensioned such that it can hold one predetermined dose.

In an embodiment, the apparatus 2, in particular the connecting device 4, comprises opening means for driving the package 3 relative to the closing means 12, and/or driving the closing means 12 relative to the package 3, in order to release and close off the outlet 11. In particular, the opening means rotate the scoop 16, for instance by engaging the circumferential wall and/or the bottom 15. The opening means can moreover comprise engagement elements for moving the closing means 12, for instance for closing off the outlet 11 when it is positioned in a loading position, for instance relatively high up at the bottom 15. The opening means can for instance be controlled via a movement device such as a motor for moving the scoop 16 and/or closing means 12, and comprise drive elements such as wheels. The opening means can for instance comprise a cam which can stop and/or drive a part of the package 3 while the rest of the package 3 is driven and/or stopped, respectively, by the connecting device 4.

In another embodiment, the opening means may be arranged such that they engage the closing means 12. The scoop 16 is then arranged rotatably relative to the closing means 12, and preferably fixed with respect to the rest of the package 3, or at least the bottom 15. While the opening means keep the closing means 12 still with respect to the apparatus 2, the user can rotate the package 3 relative to the apparatus 2 and the closing means 12, for instance until the outlet 11 extends opposite the passage 17, for releasing the outlet 11 (FIGS. 2C, 3C), or until the outlet 11 extends next to the passage 17, so that the outlet 11 is closed off. Through rotation of the package 3, in particular the bottom 15, more particularly the scoop 16, the user can move the scoop 16 relative to the passage 17 for dispensing dosages of coffee beans to the grinder 6. In particular, the user can then move the scoop 16 through the coffee beans whereby upon each stroke of 360 degrees a dose of coffee beans can be dispensed. During rotation the closing means 12 can stand still with respect to the apparatus 2 through the engagement of the opening means.

In a condition coupled with the apparatus 2, the scoop 16 is preferably arranged to have at least one vertical movement component, between a loading position and a dispense position, to allow a dose of coffee beans to be scooped up from the bottom towards the top in the inner space, at least in a condition of the package 3 coupled with an apparatus 2.

In another embodiment, not shown, the connecting device 4 can be arranged to move the scoop 16 relative to the outlet 11 and/or the bottom 15. For instance, the scoop 16 may be fixedly connected with the circumferential wall 13. The bottom 15 may be arranged rotatably relative to the circumferential wall 13. The bottom 15 may be provided with the outlet 11, so that the outlet 11 is rotatable relative to the scoop 16. In a condition of the package 3 coupled with the apparatus 2, the outlet 11 is for instance positioned in a relatively high position. By rotating the circumferential wall 13 and scoop 16 relative to the bottom 15, a dose of coffee beans can be dispensed through the outlet 11 when the scoop 16 has been rotated into a dispense position, that is, a relatively high position.

The collection of coffee beans is for instance in a first packaging process packaged in the coffee bean package 3, such that exposure of the coffee beans to ambient air is prevented. For instance, in the production process, the package 3 is closed off airtightly, and/or vacuumized or provided with a particular storability influencing gas. Thereupon the package 3 can be supplied directly or indirectly to a user. Without first being transferred into a holder, the coffee beans can in measured dosages be fed directly to the grinder 6, while the coffee bean package 3 can remain connected to the apparatus 2. For instance, after a first dosage there is a residual amount of coffee beans left in the coffee bean package 3. As the outlet 11 can be closed off after the dispensing of the dose of coffee beans, the residual coffee beans in the package 3 can remain relatively intact. Preferably, the outlet 11 is already closed a relatively short time after the whole dose of coffee beans has been fed to the grinder 6, so that contact with ambient air can be prevented. A relatively short time may be understood to mean, for instance, a few seconds or less, for instance ten seconds or less.

If a user has indicated through operation of the apparatus 3 that he wishes to have multiple cups of coffee, for instance multiple dosages of coffee beans can be dispensed in succession via the outlet 11, while the closing means 12 can meanwhile close off the outlet 11 or not.

Figure 4A:
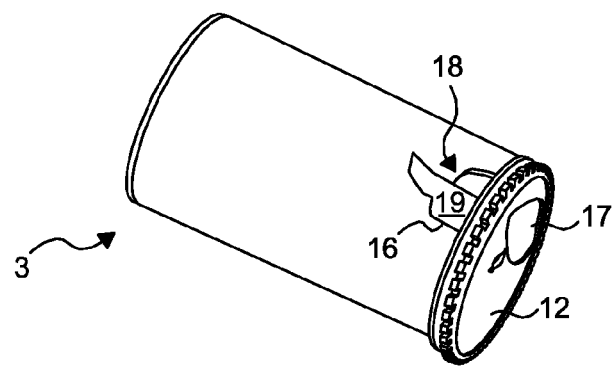
FIGS. 4A-C schematically show three method steps in section and side elevation of a further embodiment of a coffee bean package.
Figure 4B:
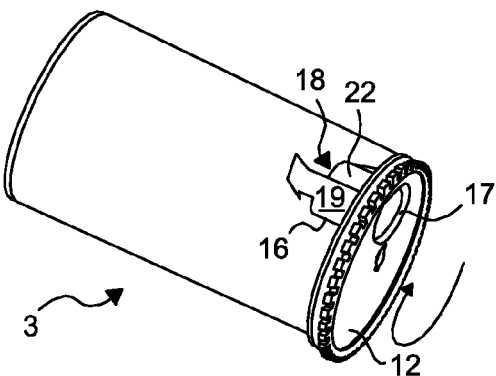
Figure 4C:
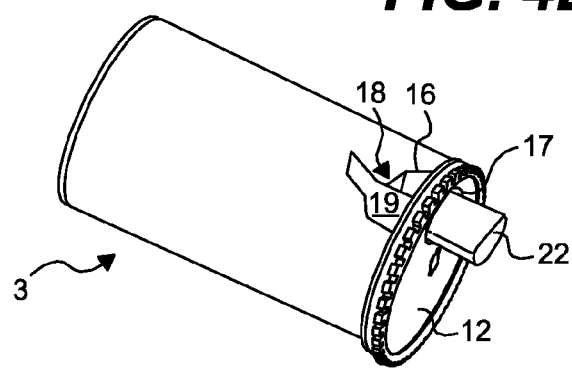

In FIGS. 4A-C a further, slightly more detailed embodiment of the coffee bean package is shown, again in three method steps. FIG. 4A shows the package with the scoop 16 in a dispense position, in which no coffee beans are present in the scoop 16, and the closing means 12 close off the outlet 11. As can be seen, the scoop 16 is provided with a projecting slide 22 which may be arranged so that upon movement of the scoop 16 the coffee beans are guided towards the loading opening 18. In FIG. 4B the scoop 16 is shown in a dispense position after the scoop 16 has rotated through 360 degrees and has carried along a dose of coffee beans 22 out of the collection of coffee beans. The closing means 12 are positioned with respect to the outlet 11 such that the outlet 11 is released, in particular the passage 17 is positioned such that it overlaps the outlet 11. For instance the closing means 12 have been rotated with respect to the position as shown in FIG. 4A. The dose of coffee beans can now under the influence of gravity slide out of the scoop 16, towards the grinder 6, as shown in FIG. 4C.

In an embodiment, the package 3 is also suitable be used loosely for dosing coffee beans, not necessarily directly to a grinder 6. For instance, the package 3 can be used to furnish the user with a particular dose of coffee beans, while the user can supply the dose manually to an apparatus with a grinder 6. The user can then hold the package 3 in the use position, at said angle α, so that the package 3 in itself can function as a dosing system. For instance, the package 3 can be opened for refilling, for instance the top wall 14 can at least partly be opened for filling the package 3. In an alternative embodiment, the package 3 is secured against refilling, for instance in that the package 3 can be opened only through deformation.

Multiple packages 3 for different types and/or tastes of coffee beans can for instance be coupled with the apparatus 2 per dosage, while the residual coffee beans in the package 3 can remain relatively preserved. Also, different packages 3 for different sizes of dosages may be utilized, for instance for different strengths of coffee.

Different coffee bean packages with different kinds of coffee beans can be successively connected to the coffee making apparatus, while each coffee bean type can be fed to the grinder in package-fresh condition. The package can be closed off after a dose of coffee beans has been passed out of it, while a residual amount of coffee beans remains behind in the package. Advantageously, the package can then be closed off practically airtightly. As a result, the package can be connected to the apparatus and uncoupled therefrom several times, while the coffee beans packaged therein can remain practically package-fresh.

A predetermined dose of coffee beans comprises for instance at most approximately 50 grams or less, in particular approximately 25 grams or less, more particularly approximately 15 grams or less, for instance approximately 7 grams, or at least between 4 and 10 grams. In an embodiment, the predetermined dose is based on an amount of coffee beans that is needed for preparing one cup of coffee beverage, for instance coffee beverage of an amount by volume of 20 to 500 milliliters, while the strength could be co-predetermined by the user, for instance through an operating element that is present on the apparatus. The predetermined dose may depend on an amount of coffee beverage and/or strength of the coffee beverage that is set by the user. The dose can be determined, for instance, on the basis of weight, volume, or amount of coffee beans. It is also possible that larger amounts of coffee beverage are prepared, such as, for instance, a jug of coffee.

The circumferential wall 13 may be cylindrically shaped, and be closed off by the top wall 14 and the bottom 15. The diameter of the cylinder can for instance be less than 200 millimeters, preferably less than 140 millimeters. The length of the cylinder can for instance be approximately 200 millimeters or less, for instance 140 milliliters or less. In another embodiment, the circumferential wall 13 is for instance angled, or provided with rounded corners.

Figure 5A:
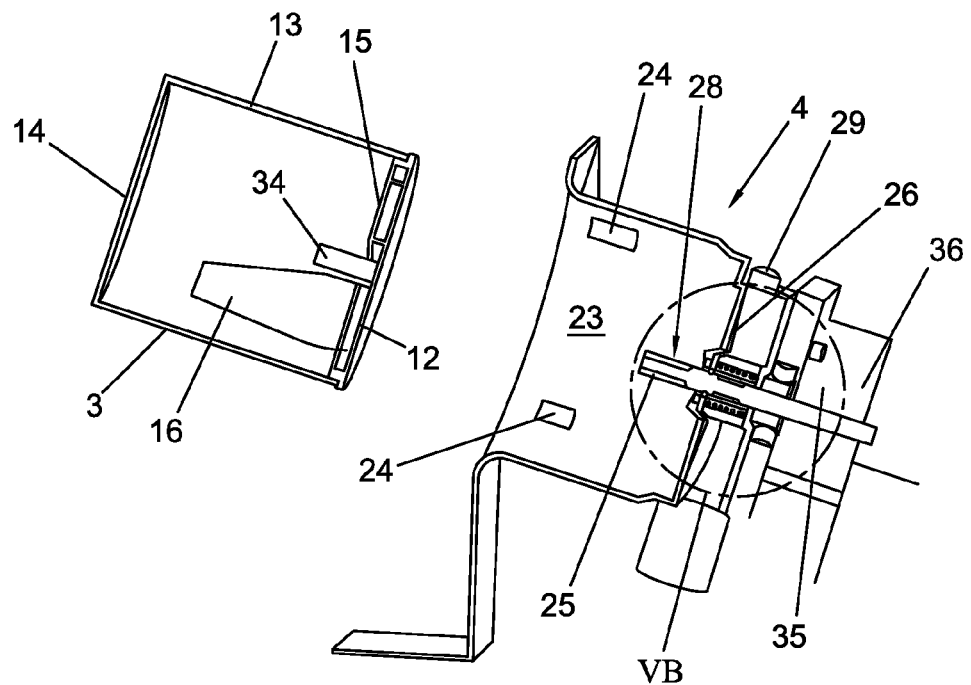
FIG. 5A shows a cross section in perspective of a package and a connecting device.
Figure 5B:
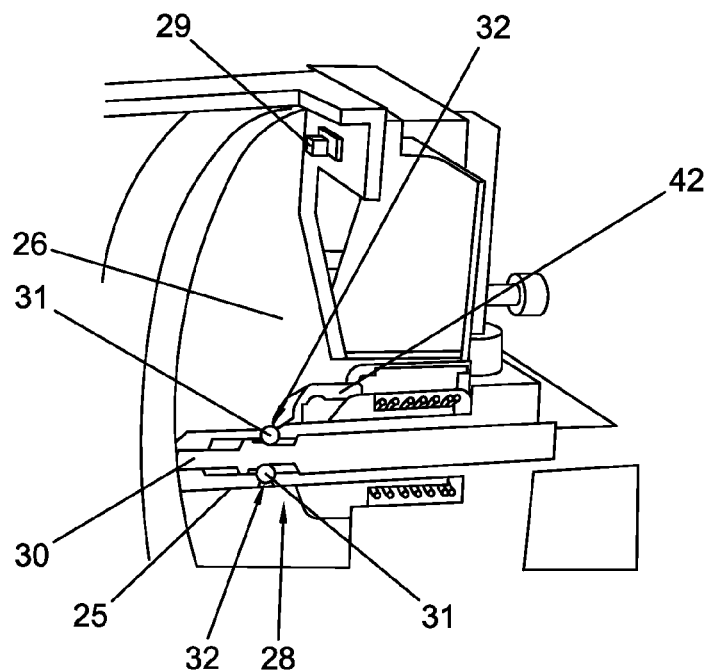
FIG. 5B shows a detail of the cross section of FIG. 5A.

In FIGS. 5A and 5B an embodiment is shown with a connecting device 4 and a package 3. The connecting device 4 can be part of a coffee making apparatus 2 with a grinder 6. The package 3 comprises a bottom 15, a circumferential wall 13 and a top wall 14. The bottom 15 may be fixedly connected with the circumferential wall 13. The scoop 16 may also be connected with the bottom 15 and extends partly parallel along the circumferential wall 13 for carrying along beans which may be situated against the bottom 15 and the circumferential wall 13 under the influence of gravity. The closing means 12 are arranged parallel to bottom 15. The closing means 12 comprise a rotary disc. The bottom 15 is provided with an outlet 11, and the closing means 12 are provided with a passage 17. In the bottom, a receiving element 34 may be provided. The receiving element 34 can comprise a hollow cylindrical part which extends partly in the inner space of the package 3. The receiving element 34 may be arranged for receiving a corresponding projection 25 of the connecting device 4.

The connecting device 4 is provided with multiple guide parts for guiding the package 3. The guide parts may be arranged for guiding the package 3 upon coupling and/or uncoupling of the package 3 with the connecting device 4. The guide parts may further be arranged for guiding the package 3 upon rotation of the package 3 in the connecting device 4. The guide parts of the connecting device 4 can comprise a relatively round guide wall 23 which corresponds with the circumferential wall 13 of the package 3, so that the package 3 can be slid into the connecting device 4. The guide parts can also comprise rollers 24 for facilitating the rotation of the package 3 in the connecting device 4. Furthermore, the connecting device 4 can comprise a projection 25 which extends from a bottom surface 26 of the connecting device 4 between the guide wall 23 for connection with the receiving element 34. The bottom surface 26 may be provided with an opening to the inlet 5. Preferably, the guide wall 23 is cylindrical and the projection 25 extends approximately parallel to the guide wall through the centerline of the guide wall 23. The projection 25 may be arranged as a lock 28, for clamping the package 3 in the connecting device 4, and also as a guide part. Preferably, the lock 28 is arranged so as to allow rotation of the package 3 in the apparatus 2. Upon coupling of the package 3 with the apparatus 2, the package 3 can be slid parallel to the guide wall 23 and the projection 25 in the connecting device 4, until the bottom 15 of the package 3, or at least the closing means 12, extends practically against the bottom surface 26. In the connected condition of the package 3, the projection 25 extends preferably in the receiving element 34 of the package 3.

Adjacent the bottom surface 26 of the connecting device 4, a detector device 29 may extend. The detector device 29 can comprise a microswitch which can be mechanically activated. For instance, the microswitch may be activated in that it is depressed by the closing means 12 of the package 3. By switching on the detector device 29, the lock 28 can be activated, so that the package 3 in principle cannot be taken from the apparatus 2 anymore. The lock 28 preferably comprises a movably arranged engagement element for engaging the package 3 and keeping it clamped against the apparatus, while allowing the package 3 to rotate in the apparatus 2 about the projection 25. The lock, in accordance with a known principle, can for instance comprise a pin 30 with spheres. The pin 30 may be included in the projection 25, such that the pin 30 can move only in axial direction. The projection 25 comprises openings 32 through which the spheres 31 extend in part. By moving the pin in axial direction, the spheres 31 can be moved through the openings 32 into an outside position, that is to say, to a point outside the projection 25. The pin 30 may be provided with a cam 44 for moving out the spheres 31.

Figure 6A:
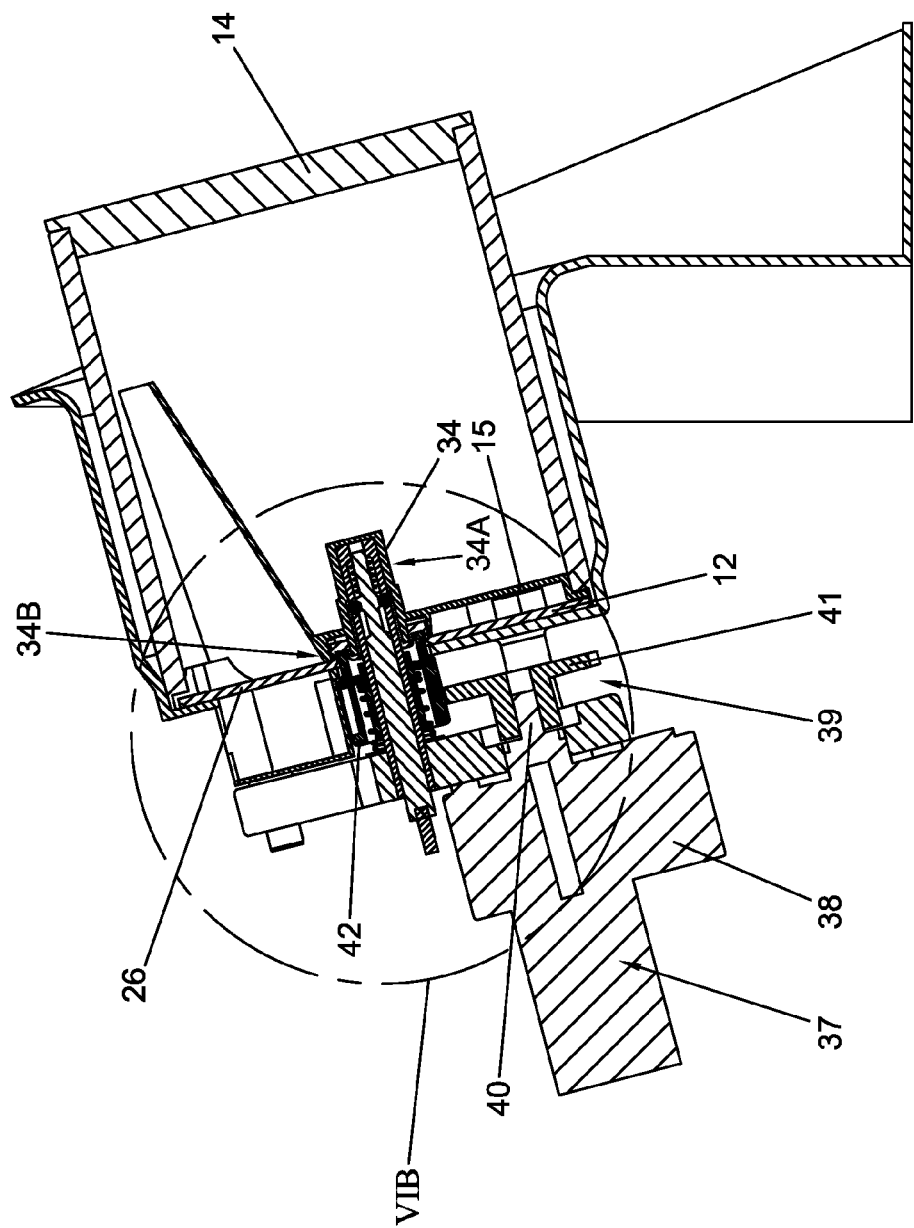
FIG. 6A shows a cross section in side elevation of a package connected to a connecting device.
Figure 6B:
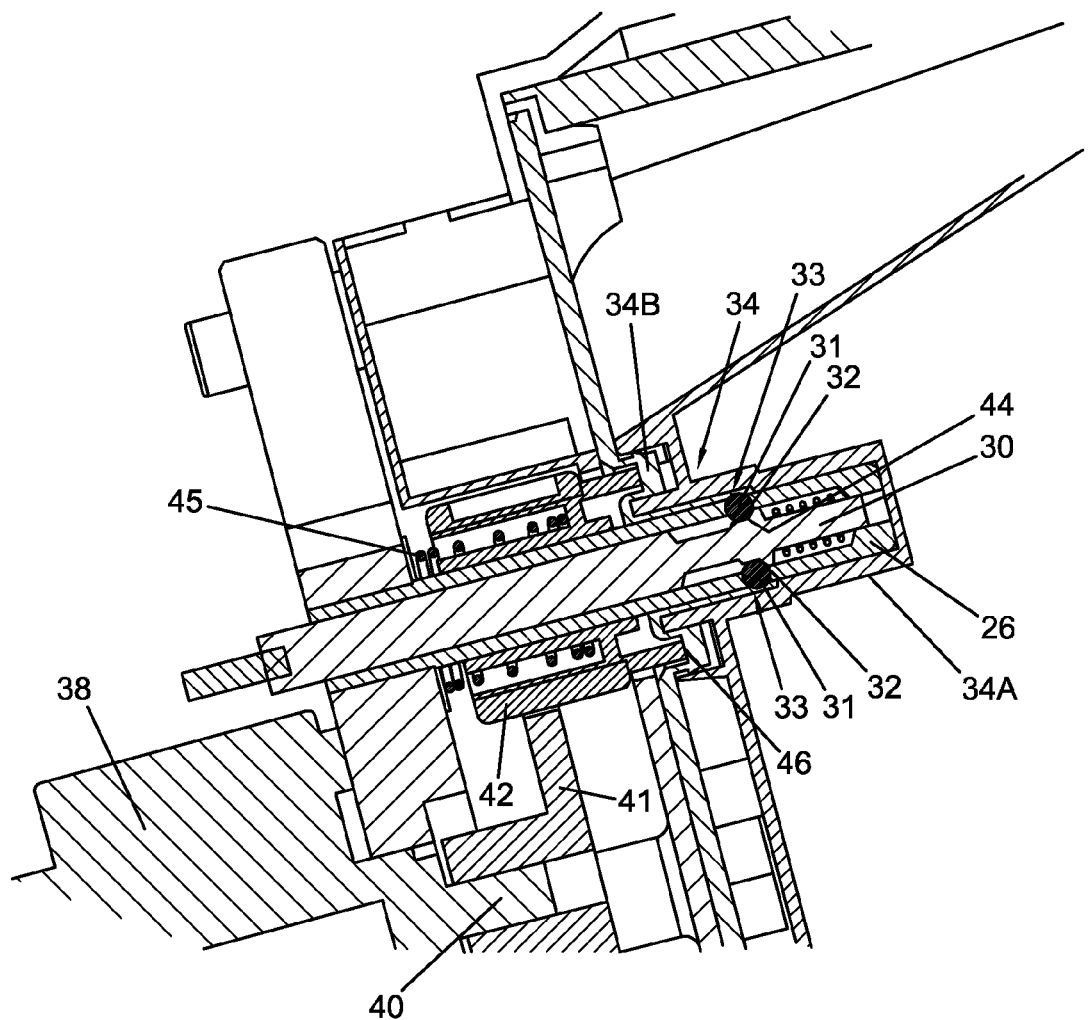
FIG. 6B shows a detail from the cross section of FIG. 6A.

In an outside position, the spheres 31 extend partly outside the projection 25. When the package 3 is connected, as shown in FIGS. 6A and 6B, the spheres 31 extend along a stop edge 33 on the inside of the receiving element 34 of the package. The stop edge 33 prevents the receiving element 34 being moved along the spheres 31 for taking the package 3 out of the apparatus 4.

The lock 28 can be activated by moving the pin 30 in axial direction. The pin 30 can for instance be moved in axial direction with the aid of a solenoid 35. The solenoid 35 can be moved through a signal from the detector device 29 in the direction away from the pin 30. Through activation of the solenoid 35, the spheres 31 are moved to the outside position, so that the package 3 cannot, or can only with difficulty, be uncoupled from the apparatus 3. The connecting device 4 may be provided with a stop 36 which can define an end position of the solenoid 35, for placing the spheres 31 in the outside position with the pin 30.

Figure 7:
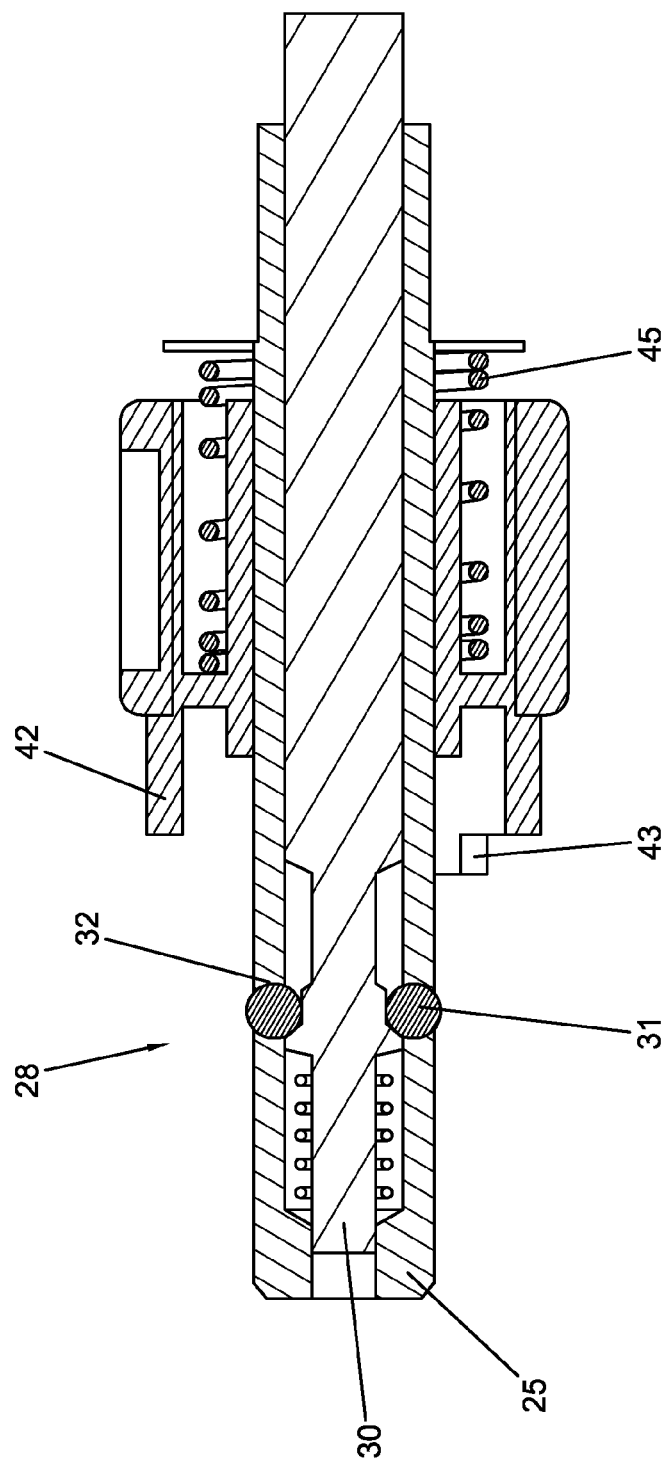
FIG. 7 shows a lock with a sleeve, as used in the embodiment of FIGS. 5A and 6A.

The connecting device 4 may furthermore be provided with a drive 37 for rotating the package 3, or at least the scoop 16. The drive 37 may be provided with a rotary motor 38 and a transmission 39. The transmission 39 may for instance comprise a shaft 40 and/or a gear 41. The transmission 39 can furthermore comprise a sleeve 42, which may be arranged around the lock 28. The sleeve 42 can be driven through the gearwheel 41. The sleeve 42 may be arranged to engage the package 3, for instance on and/or in the receiving element 34. The receiving element 34 may to that end be arranged with a first part 34A for receiving the lock 28, and a second part 34B for receiving the drive 37, in particular the sleeve 42. The first part 34A can be a part of the bottom 15, the second part 34B can be a part of the closing means 12. The sleeve 42 may be provided with a cam 43, such as shown in FIG. 7, which cam 43 can engage an engagement element which is provided in the second part 34B of the receiving element 34. For instance, the receiving element 34 is to that end provided with an abutment edge 46, in which an opening is provided, in which the cam 43 can be received. When the cam 43 of the sleeve 42 extends into this opening, the package 3 can be driven via the second part 34B of the receiving element 34. In principle, the drive 37 then drives the closing means 12. Furthermore, a spring 45 may be provided which in a connected condition of the package pushes the sleeve 42 towards the package 3. When the cam 43 is adjacent the opening in the abutment edge 46, the cam 43 can be pushed into the opening.

When connecting the package 3 to the connecting device 4, the circumferential wall 13 of the package 3 is guided into the connecting device 4 by the guide wall 23. The receiving element 34 can be guided along and around the projection 25. The closing means 12 can move towards the bottom surface 26 until the detector device 29 detects the package 3. The stop edge 33 thereby passes the spheres 31 of the lock 28. The detector device 29, as it is moved by the package 3, delivers a signal to the solenoid 35, or releases the solenoid 35, so that the solenoid 35 moves up to the stop 36, whereby the pin 31 is carried along. As a result of the pin 31 moving in axial direction, the spheres 31 are pushed by the cam 44 through the openings 32 outside the projection 25, so that the stop edge 33 cannot move back over the spheres 31, at least not without some deformation of the package 3 or unlocking of the lock 28. Therefore the package 3 after coupling can be relatively fixedly coupled with the connecting device 4. The package 3 can for instance be released again by activating the solenoid 35 through an operating element on the apparatus 2, so that the pin 30 moves back again and the spheres 31 retract.

When the apparatus 2 is activated for preparing an amount of coffee, for instance one predetermined dose of beans may be needed. To this end, it may be necessary that the scoop 16 should perform at least one complete rotation, so that the scoop 16 moves wholly through the coffee beans in the package 3, and thereupon with the outlet 11 in a dispense position, is positioned above the level of the coffee beans. The dispense position can be a position at the top in the package 3. The drive 37 can drive the package 3, and hence the scoop 16. When the package 3 is connected to the connecting device 4, with the aid of the lock 28, then, through activation of the apparatus 2, the sleeve 42 can be rotated through the drive 37. Unless the cam 43 of the sleeve 42 is already positioned in the opening of the receiving element 34, the sleeve 42 will be rotated along the abutment edge 46 of the receiving element 37 until the cam 43 reaches the opening in the receiving element 34 and is pushed into the opening by the spring 45. Then the sleeve 42 can be received at least in part in the second part 34B of the receiving element 34 for drive of the package 3, or at least the scoop 16. The package 3 can then rotate along with the drive 37. The position of the opening 44 is preferably predetermined with respect to the scoop 16 and/or the outlet 11. The cam 43 can then be so rotated, for instance two rotations, until the scoop 16 is in a dispense position. For instance at least upon the second rotation of the drive 37, the scoop 16 has then been able to traverse a complete rotation and scoop up the predetermined dose of coffee beans.

The closing means 12 in principle close off the package 3 when the package 3 is taken from and/or coupled to the apparatus 2. When the scoop 16 is in the dispense position, after the activation of the apparatus 2 for preparing the coffee, the closing means 12 can be turned so that the passage 17 is opposite the outlet 11 and the scoop 16. Thereupon the predetermined dose of beans in the scoop 16 can slide under the influence of gravity through the outlet 11 and the passage 17, and through the inlet 5, towards the grinder 6. A measuring device may be provided for verifying whether the dispensed dose of coffee beans does in fact involve approximately the predetermined amount, after which the coffee beans can proceed further to the grinder 6. For instance, the measuring device comprises a weight sensor or other type of sensor in the path of the beans towards the grinder 6. When the scoop 16 is empty, the closing means 12 can be rotated again so that the outlet 11 is closed off again.

Besides being employed for driving the scoop 16, the drive 37 can also be employed, for instance, for driving the closing means 12. For instance, the closing means 12, for placing the passage 17 opposite the outlet 11, are turned in a rotary direction opposite to the rotary direction of the scoop 16. For instance, the sleeve 42 engages the receiving element 34. The receiving element 34 is preferably connected with the closing means 12. In particular, the part of the receiving element 34 which is engaged by the sleeve 42 is actually a part of the closing means 12, so that the sleeve 42 can rotate the closing means 12. The package 3 may be arranged such that upon rotation of the sleeve 42 in one direction, the closing means 12 rotate along with the scoop 16 and outlet 11, and in the other direction the closing means, by contrast, rotate relative to the outlet 11 for the purpose of opening and closing the outlet 11.

When the sleeve 42 rotates the closing means 12 for passing the scoop 16 through the beans, the bottom 15 of the package 3, and the scoop 16 and passage 17, can be carried along with the closing means 12. For instance, the closing means 12 can carry the bottom 15 along through friction. However, the bottom 15 and the closing means 12 are preferably so arranged with respect to each other that in the opposite rotary direction the closing means 12 do not carry along the bottom 15. For instance, the closing means 12 and/or the bottom 15 are to that end provided with a finger hinging to one side, or a friction element which offers resistance only in one direction, or the like. Also, the guide wall 23 and/or the guide rollers 24 may be arranged so that the package 3 is guided into the apparatus only in one rotary direction, and in the opposite rotary direction is stopped by friction, so that the closing means 12 can be moved relative to the outlet 11. The guide wall 23 can for instance comprise a knurled path or rubber. The guide rollers 24 can for instance comprise rubber and/or rotate only in one rotary direction for guiding the package 3.

For releasing the outlet 11, in a dispense position of the scoop 16, the closing means 12 can be turned from a position in which the outlet 11 is closed off by the closing means 12, to a release position, in opposite direction to the rotary direction of the package 3, so that the passage 17 is in line with the outlet 11. For instance, the closing means 12 are to that end rotated through approximately 60°. After the coffee beans have been dispensed from the scoop 16, the closing means 12 can be rotated for instance through 300°, so that the outlet 11 is closed off again, and upon a next dispense position of the scoop 16, after the scoop has been moved at least once through the beans, the closing means 12 can be rotated 60° again for release of the outlet 11.

In the above description, the detector device 29 may further comprise a different type of sensor, which may be arranged for detecting the package 3 in connected condition, as for instance an optical and/or magnetic sensor, or for instance a radiofrequency chip reader or other reading device. Also, a detection system may be provided for detecting whether the scoop 16 and/or the outlet 11 is in a dispense position, in particular an upper position. The skilled person will also understand that in the above description corresponding engagement elements, such as for instance cams, openings, and so forth, can be interchanged between the apparatus 2 and the package 3, for achieving the same function. A cam of the apparatus 3 can engage an opening or engagement element of the package 2, while instead the package 3 may for instance be provided with a cam, and the apparatus 2 with a corresponding opening or engagement element.

The bottom surface 26 of the connecting device 4 of the apparatus 2 may be provided with an opening 47 towards the inlet 5. Coffee beans can be dispensed via the outlet 11 and passage 17 through the opening 47 to the grinder 6. In an embodiment, the opening 47 towards the inlet 5 is closed when no package 3 is connected to the apparatus 2. For instance, a valve or other closure is provided for closing off the inlet 5 when the package 3 is not connected. The detection device 29 or other detection system may be arranged to open or close the inlet 5 upon detection of the package 3. The detection device 29, or other detection system, may also be arranged not to open the inlet 5 until the outlet 11 and the passage 17 are both in line with the opening 47. In the latter case, only when the outlet 11, passage 17 and the opening 47 at least partly overlap each other will the inlet 5 be released. This can prevent coffee beans being directly supplied into the inlet 5. In another embodiment, the grinder 6 is not activated, or at least enabled to grind supplied coffee beans, until the package 3 is connected to the connecting device 4 and/or until the inlet 11, passage 17 and the opening 47 at least partly overlap each other for dispensing beans. In such a case, the detection device 29 or other detection system can deliver a signal to the grinder 6 upon detection of the package 3.

In yet another embodiment, a key is provided, which key can activate the detection device 29 and/or the detection system for releasing the inlet 5 and/or the grinder 6. By activating the apparatus 2 with the key, coffee beans can be supplied and ground. For instance, the coffee beans can then be supplied manually to the apparatus 2, or from a dummy package. The key may for instance be mechanically coupled with the detection device 29 and/or with the sleeve 42 and/or with the projection 25. The key can for instance comprise a form lock which corresponds to the projection 25 and the sleeve 42.

Figure 8:
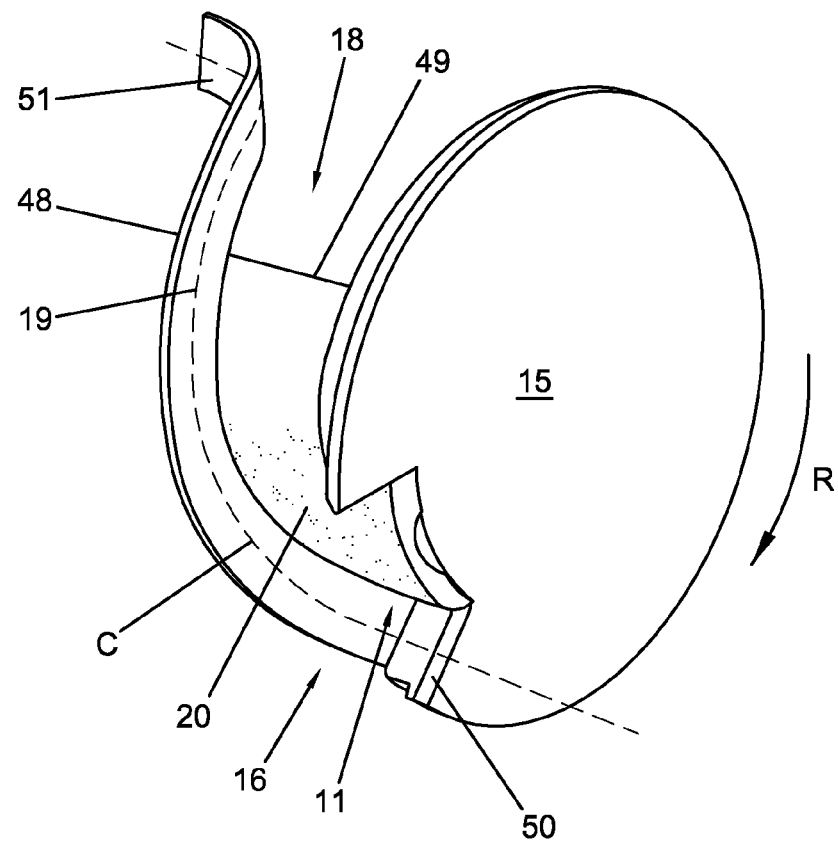
FIG. 8 shows in perspective a package component comprising a scoop with bottom.

In FIG. 8 an embodiment of a scoop 16 is shown. The scoop 16 may be fixedly connected with the bottom 15 or be formed integrally therewith. The scoop 16 and the bottom 15 can in use be connected with the circumferential wall 13 of the package 3. The scoop 16 and the bottom 15 can jointly form a loose package component.

The scoop 16 may be provided with loading walls 19, 20. A first loading wall 19 can comprise an upper edge 48 which in use can extend against or near the circumferential wall 13 of the package 3, so that the beans can be passed along the wall 19 in the scoop 16. A second loading wall can be the scoop bottom 20, also for guiding and surrounding coffee beans in the package 3. The scoop bottom 20 can in use extend approximately parallel to the circumferential wall 13. In this description, the first loading wall 19 will be referred to as loading wall, and the second loading wall as scoop bottom 20.

The bottom 15 may be provided with an outlet 11 for dispensing coffee beans from the scoop 16. The outlet 11 is preferably situated opposite the scoop 16. The loading wall 19 can extend along a curve along which the coffee beans are guided in the scoop, and through the outlet 11. The scoop bottom 20 can comprise a dosing edge 49. The loading opening 18 of the scoop 16 can extend between the dosing edge 49, the loading wall 19, the bottom 15 and the circumferential wall 13. A carrying wall part 51 of the loading wall 19 can extend beyond the dosing edge 49 for carrying along coffee beans in the package 3 upon rotation through the coffee beans, so that the coffee beans can be guided along the loading wall 19 over the dosing edge 49 into the scoop 16. The carrying wall part 51 can extend in a bend, along the curve C, in a direction away from the bottom 15.

The scoop 16 may be arranged such that it fills when the scoop 16 rotates in a rotation direction R. A part of the beans will be partly carried along by the carrying wall part 51 during the rotation, and be guided between the carrying wall part 51 and the bottom 15 into the scoop 16. The height of the loading wall 19 can determine the distance between the circumferential wall 13 and the scoop bottom 20. Once loaded, the coffee beans can be situated between the circumferential wall 13, the loading wall 19, the scoop bottom 20, the bottom 15 and the closing means 12, which define the dosing space of the scoop 16. The dosing space of the scoop 16 can have a predetermined volume for containing a predetermined dose of coffee beans. The closing means 12 can prevent the beans falling out of the outlet 11. The loading wall 19 can terminate at a lower edge 50 of the outlet 11. When the closing means 12 release the outlet 11, the beans will flow along the loading wall 19 and the scoop bottom 20 out of the outlet 11.

Figure 9A:
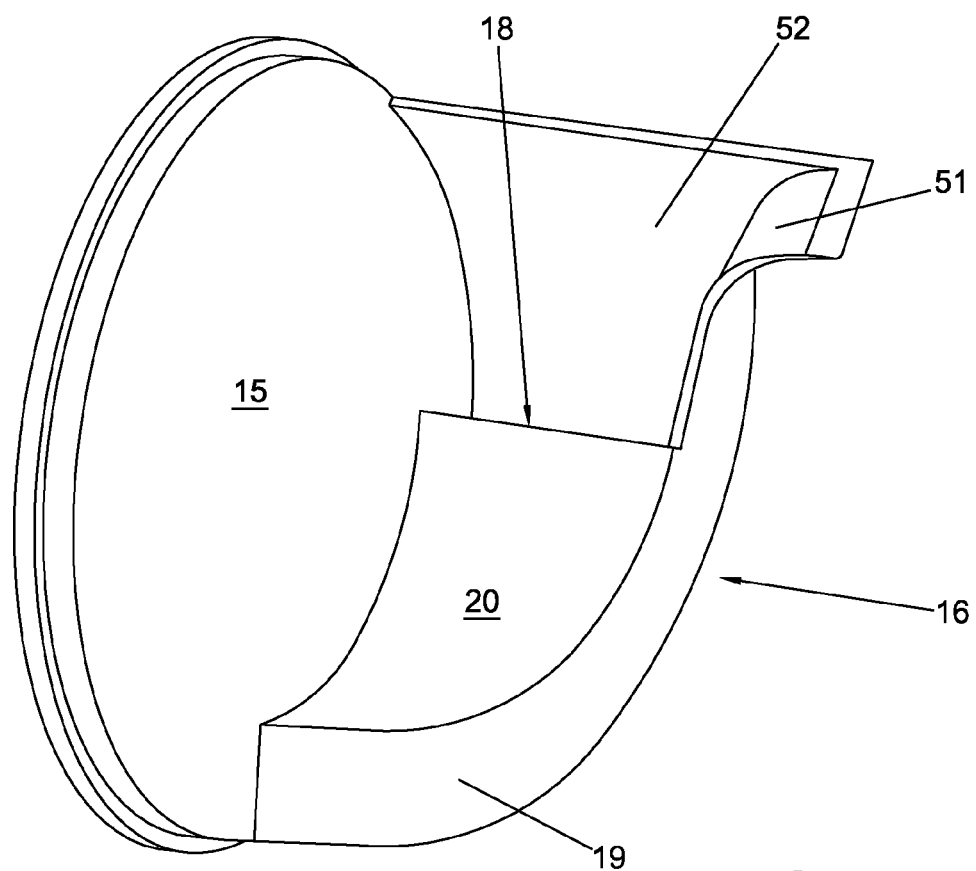
FIG. 9A shows in perspective an alternative package component comprising a scoop with bottom and a rear wall.
Figure 9B:
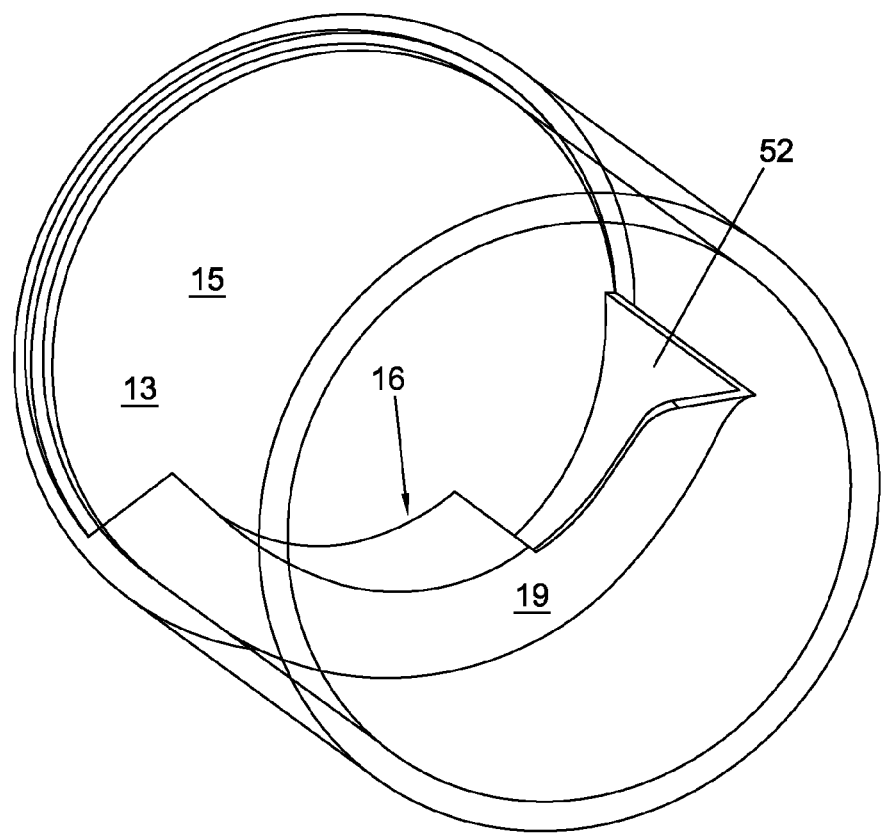
FIG. 9B shows in perspective a package with the alternative package component of FIG. 9A.

An embodiment of the scoop 16 may be provided with a rear wall 52 (FIGS. 9A, 9B). The rear wall 52 can extend approximately opposite the scoop bottom 20 for forming the dosing space. The rear wall 52 can for instance extend between the end of the carrying wall part 51 and the bottom 15. This embodiment may be advantageous, for instance if the circumferential wall 13 is not cylindrical and/or not accurately shaped, and/or if the loading wall 19 does not wholly extend along the circumferential wall 13. In particular, this embodiment can provide advantage if the circumferential wall 13 adjacent the bottom has a smaller diameter than the circumferential wall 13 remote from the bottom 15.

Figure 10:
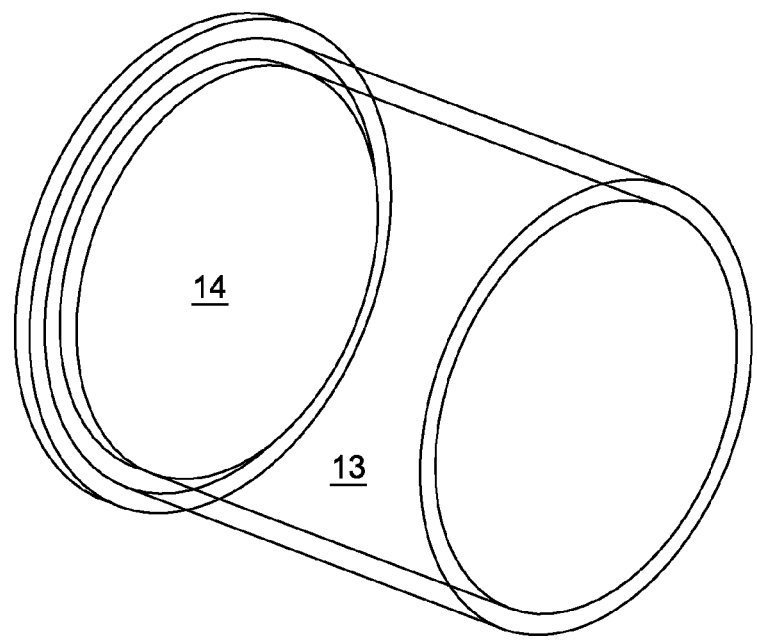
FIG. 10 shows in perspective a circumferential wall with top wall for a coffee bean package.

During assembly of the package 3, the bottom 15 and scoop 16 can be connected with the circumferential wall (FIG. 10). The bottom 15 and scoop 16 can be fixed with respect to the circumferential wall 13, so that for taking up coffee beans into the scoop 16 the whole package 3, or at least the circumferential wall 13, is to be rotated. The bottom 15 may be coupled with the circumferential wall 13 through gluing, clamping, sealing, snapping or in another suitable manner.

Figure 11:
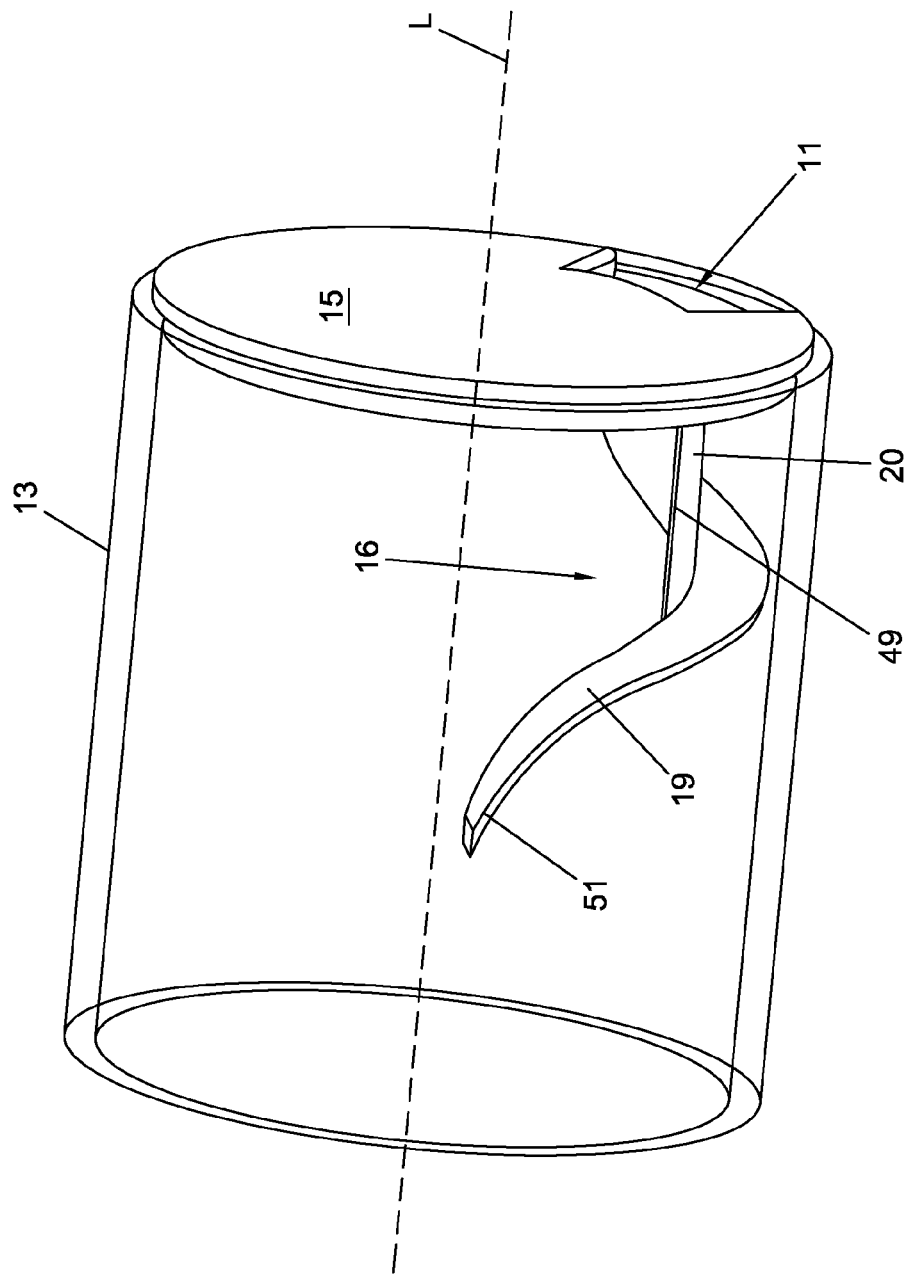
FIG. 11 shows in perspective a coffee bean package with a scoop and bottom according to FIG. 8.

In FIG. 11 a package 3 is shown. In this embodiment, the top wall 14 has been taken off. The bottom 15 and scoop 16 are connected with the circumferential wall 13. For taking up coffee beans into the scoop 16, the scoop 16 can move and rotate about the rotation axis L of the package 3. The circumferential wall 13 can then rotate along. The rotation axis L and/or the circumferential wall 13 can include an angle with the horizontal of preferably between 2 and 30 degrees, in particular between 4 and 15 degrees, more particularly approximately 13 degrees. As a result, the coffee beans in the package 3 can shift towards the bottom 15, or at least remain lying against the bottom 15 and the part of the circumferential wall 13 adjacent the bottom, so that the scoop 16 during rotation moves through the beans. As the scoop 16 moves through the beans, the beans are loaded by the carrying wall part 51 and the loading wall 19 into the dosing space.

Figure 12:
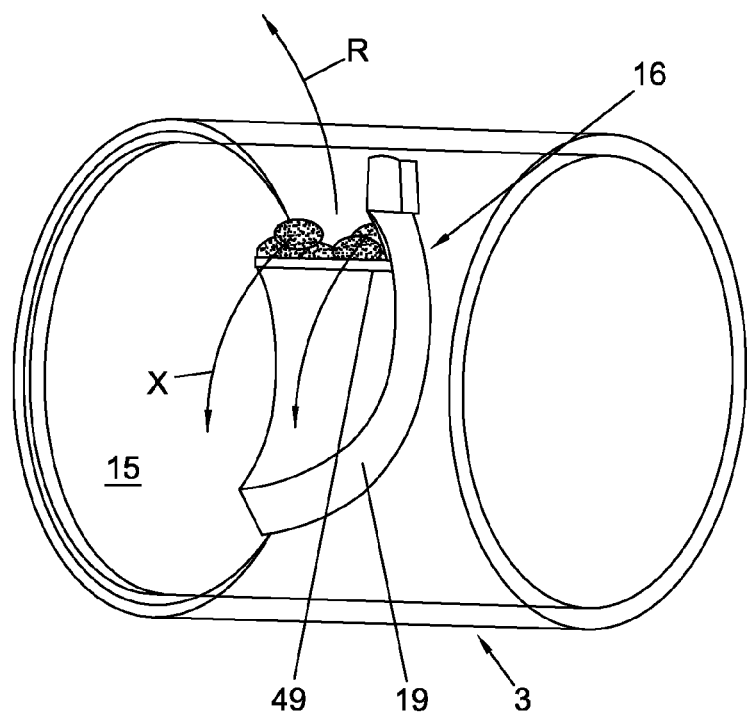
FIG. 12 shows in perspective a package with a scoop filled with an excess of beans.
Figure 13:
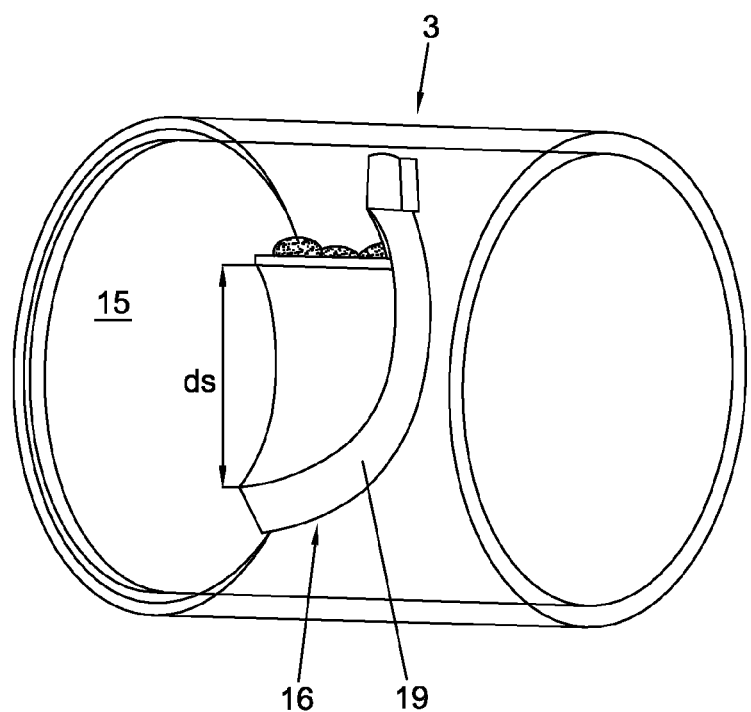
FIG. 13 shows in perspective the package according to FIG. 12 without excess.

As the scoop 16 is moved through the beans, the coffee beans collect in the scoop 16. Upon upward movement of the scoop 16, for instance a few beans can fall back over the dosing edge 49, as shown in FIGS. 12 and 13. In FIG. 12 it can be seen that the coffee beans have collected in the scoop 16. The rest of the coffee beans in the package 3 is not shown, for clarification of the illustration. As can be seen in FIG. 12, a part of the beans in the scoop 16 projects above the dosing edge 49. These beans are relatively unstably disposed and, upon upward movement of the scoop 16, as indicated with R, of the dose of beans in the scoop 16, fall off, over the dosing edge 49, as indicated with X. At least a part of the relatively unstably disposed beans can fall off over the edge 49 of the stack of scooped-up beans until no beans fall over the edge anymore and the dose of coffee beans that is left does not decrease anymore, as shown in FIG. 13. From various tests, an optimum height position can be determined where no beans fall from the scoop 16 anymore. The volume of the dose of coffee beans that is scooped up by the scoop 16 can be approximately equal upon each rotation.

Figure 14:
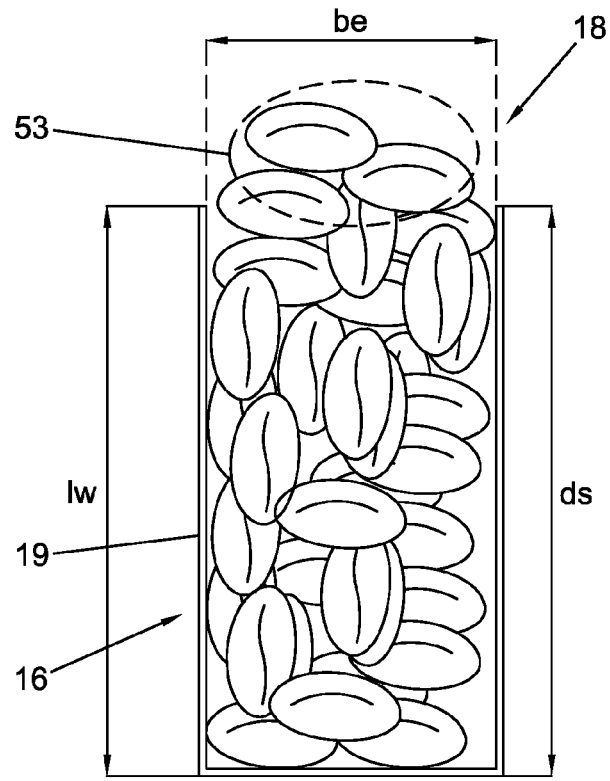
FIG. 14 shows a schematic cross section of a filled scoop with an excess of beans with a loading opening having a relatively small surface.
Figure 15:
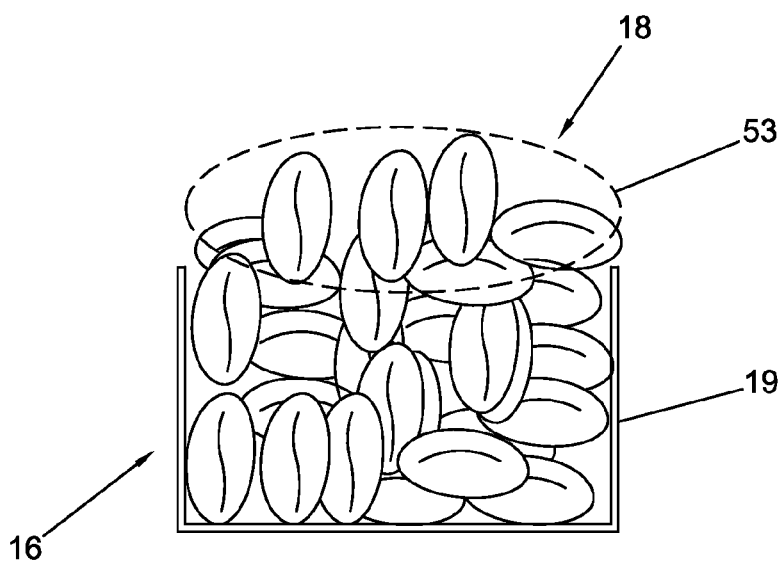
FIG. 15 shows a schematic cross section of a filled scoop with an excess of beans with a loading opening having a relatively large surface.

In FIGS. 14 and 15, schematic cross sections of different scoops 16 are shown. The scoop 16 as shown in FIG. 14 has a relatively narrow loading opening 18, and for instance also a relatively short dosing edge 49 and/or narrow scoop bottom 20. In particular, the widest cross section $b_l$ of the loading opening 18 can for instance be smaller than the depth $d_s$ of the scoop 16 and/or the length $l_w$ of the loading wall 19. Said length $l_w$ and/or depth $d_s$ can for instance be measured from the dosing edge 49 up to the lower edge 50 of the outlet 11. In principle, given a relatively small surface of the passage opening 18, less spread will occur in the dosages of the beans by the scoop 16. As can be seen, the excess 53 of beans in FIG. 14 is relatively small with respect to the excess 53 of beans in FIG. 15, since in FIG. 15 the loading opening 18 of the scoop 16 is relatively large. The spread of successive dosages of coffee beans can therefore be larger in FIG. 15 than the spread in FIG. 14.

It has been found that given a relatively small surface of the loading opening 18, with respect to the size of the coffee beans, there may be a risk of the beans flowing in relatively difficultly. In the relatively narrow dosing space in the scoop 16, the beans may for instance get stuck, against each other and/or against the walls 19, 20, 13, 15, 52. Therefore the loading opening 18 is preferably such that a balance can be achieved between a favorable inflow of the coffee beans and limitation of a spread of the dose of coffee beans in the scoop 16 through reduction of the excess 53. In an embodiment, the scoop 16 may be at least once, in particular at least 1.3, more particularly at least 1.6 times as deep as the widest cross section $b_1$ of the loading opening 18. Similarly, the loading wall 19 can be at least once, in particular at least 1.3 times, more particularly at least 1.6 times as long as the widest cross section $b_l$ of the loading opening 18. In an embodiment, the scoop 16 is for instance at least approximately twice as deep as the width $b_l$ of the loading opening 18.

Figure 16:
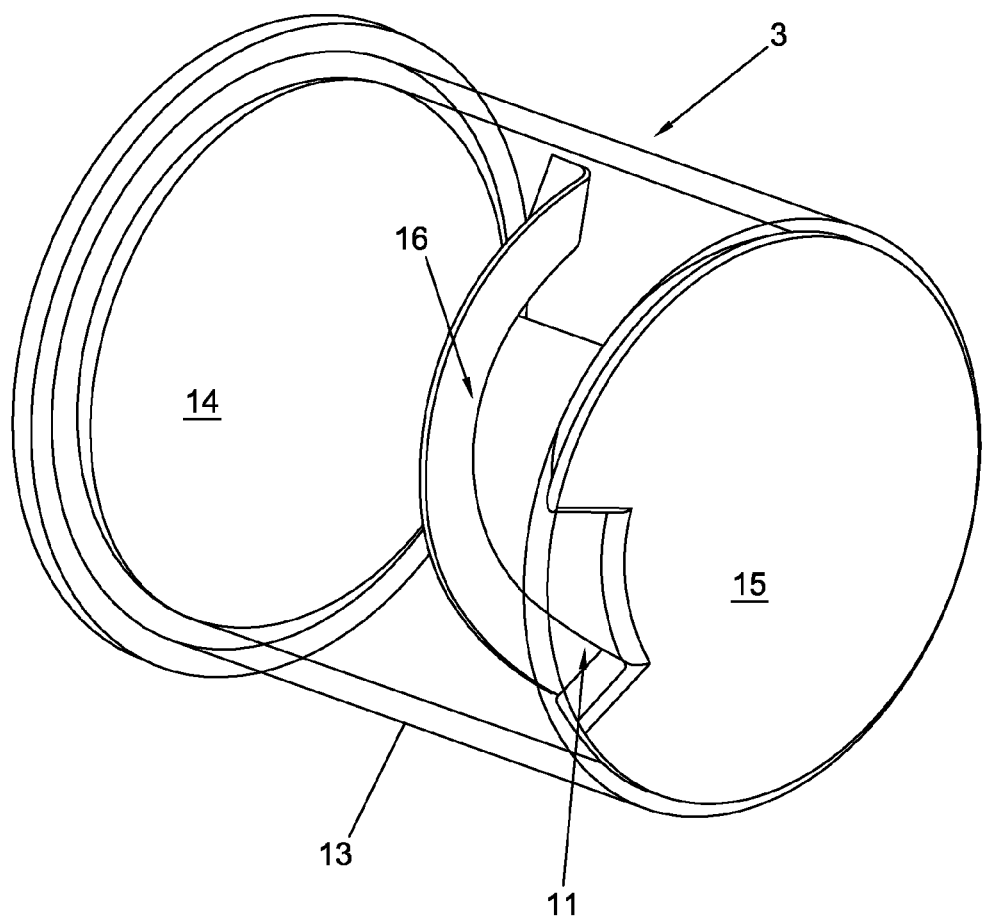
FIG. 16 further shows a perspective view of the package with a comparable scoop to that shown in FIG. 8.

In FIG. 16 a possible dispense position of the scoop 16 is shown. In a dispense position, the coffee beans are dispensed through the outlet 11, preferably in that the outlet is released by the closing means 12 (not shown). As shown in FIG. 16, the dosing edge 49 is then preferably situated in a relatively high position, in particular the dosing edge 49, in a dispense position, preferably extends above the upper surface of the rest of the coffee beans in the package 3. Thereupon the scoop 16, in principle, will not be loaded further anymore, and the outlet 11 can be released. The scoop 16 during dispensing can remain in the dispense position for some time for dispensing the coffee beans towards the grinder 6.

Figure 17:
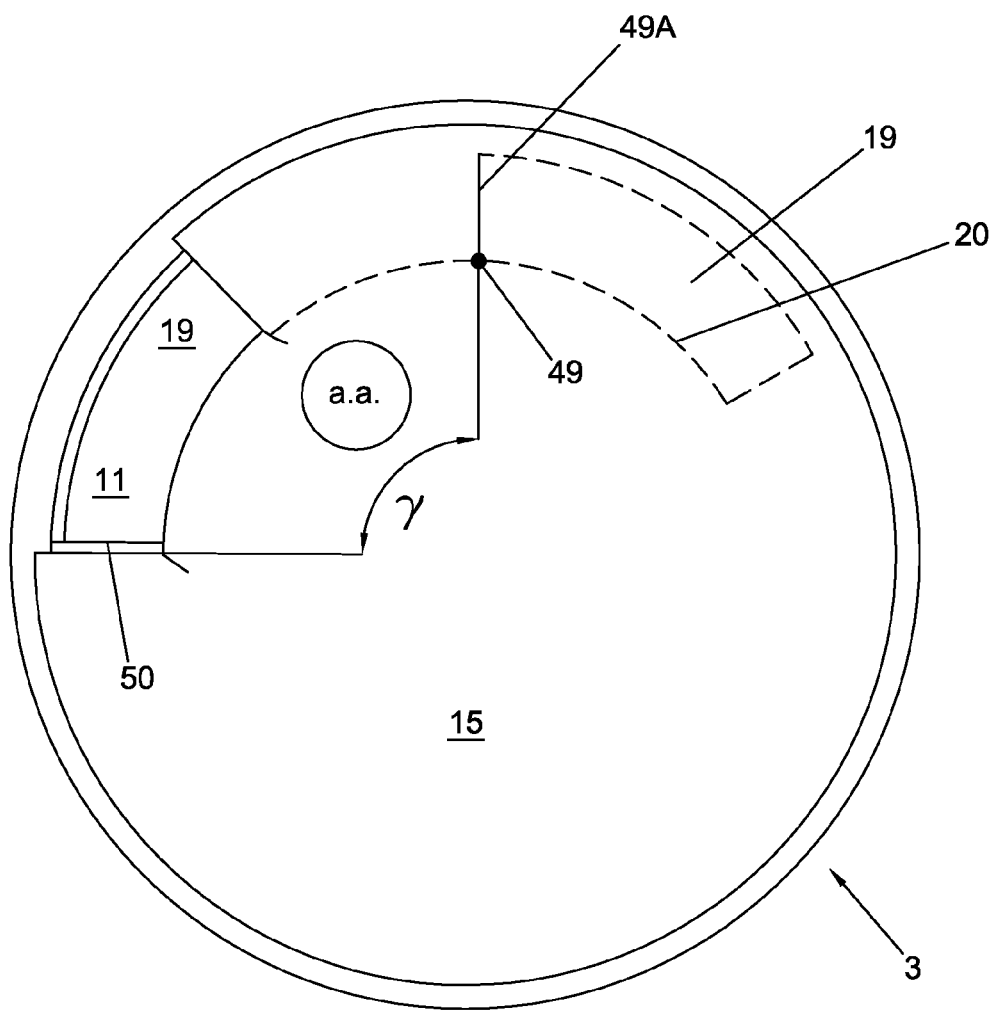
FIG. 17 shows in front view the bottom of the package.
Figure 18:
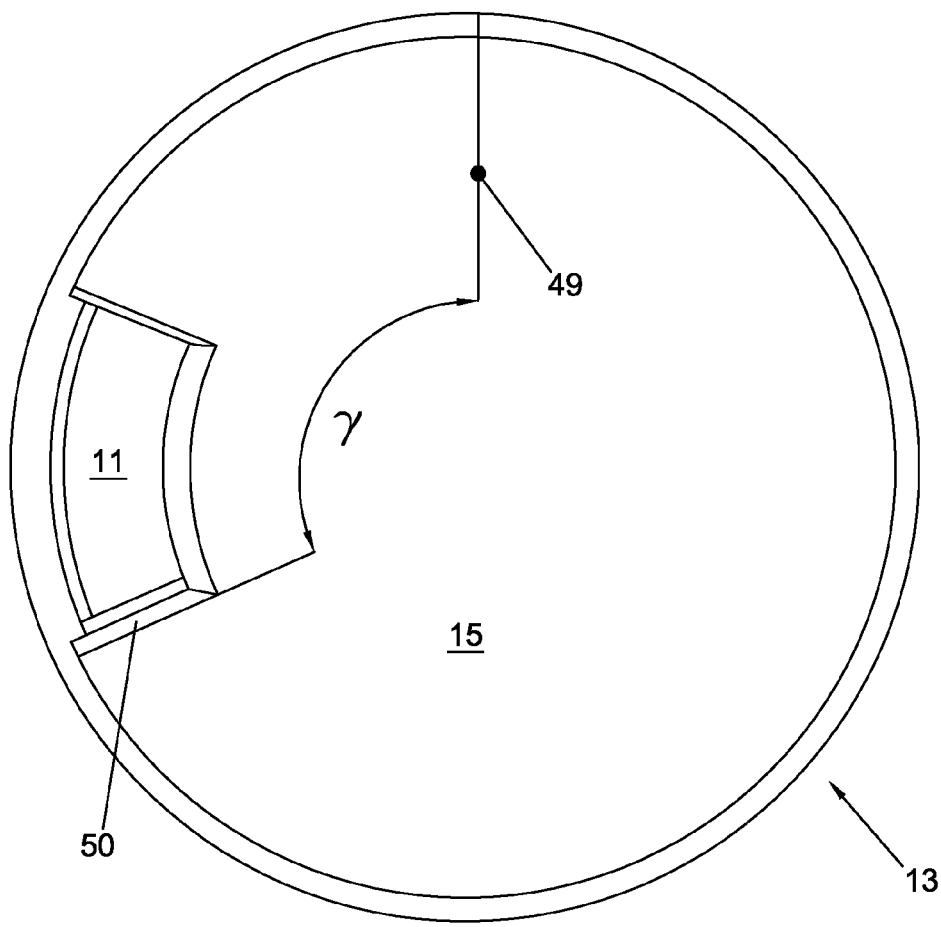
FIG. 18 shows in front view the bottom of the package with a scoop of alternative design to FIG. 17.

In FIG. 17 a dispense position of the scoop 16 is shown, in a front view of the package 3. For instance, the dosing edge 49 can extend approximately in the highest position, so that at least after some time of standstill no excess 53 of beans is formed. Reference number 49A denotes a projection line on the loading wall 19, which extends from the dosing edge 49 straight up along the loading wall 19, to clearly represent the position of the dosing edge 49. With the position of the dosing edge 49 as shown, a relatively accurate dosage can be achieved. For instance, the lower edge 50 of the outlet 11 in the dispense position can extend approximately horizontally, and/or the dosing edge 49 in the dispense position can extend at an angular distance γ of approximately 90 degrees from the lower edge 50 of the outlet 11. In approximately horizontal position of the lower edge 50, the coffee beans can be dispensed from the scoop 16 in a relatively simple and controlled manner, preferably along the curve C of the loading wall 19. The angular distance γ between the lower edge 50 and the dosing edge 49 may also be, for instance, greater or smaller than approximately 90 degrees, for instance approximately 100 degrees or more, preferably 110 degrees or more, or 80 degrees or less. In an embodiment, the system is arranged such that the dosing edge 49 in a dispense position extends approximately in a highest position, and the lower edge 50 extends for instance at an angular distance γ of approximately 110 degrees from the dosing edge 49, in a relatively oblique position, in particular approximately 20 degrees with respect to the horizontal (see FIG. 18). A proportional position may also be suitable for dispensing coffee beans from the outlet 11.

Figure 19:
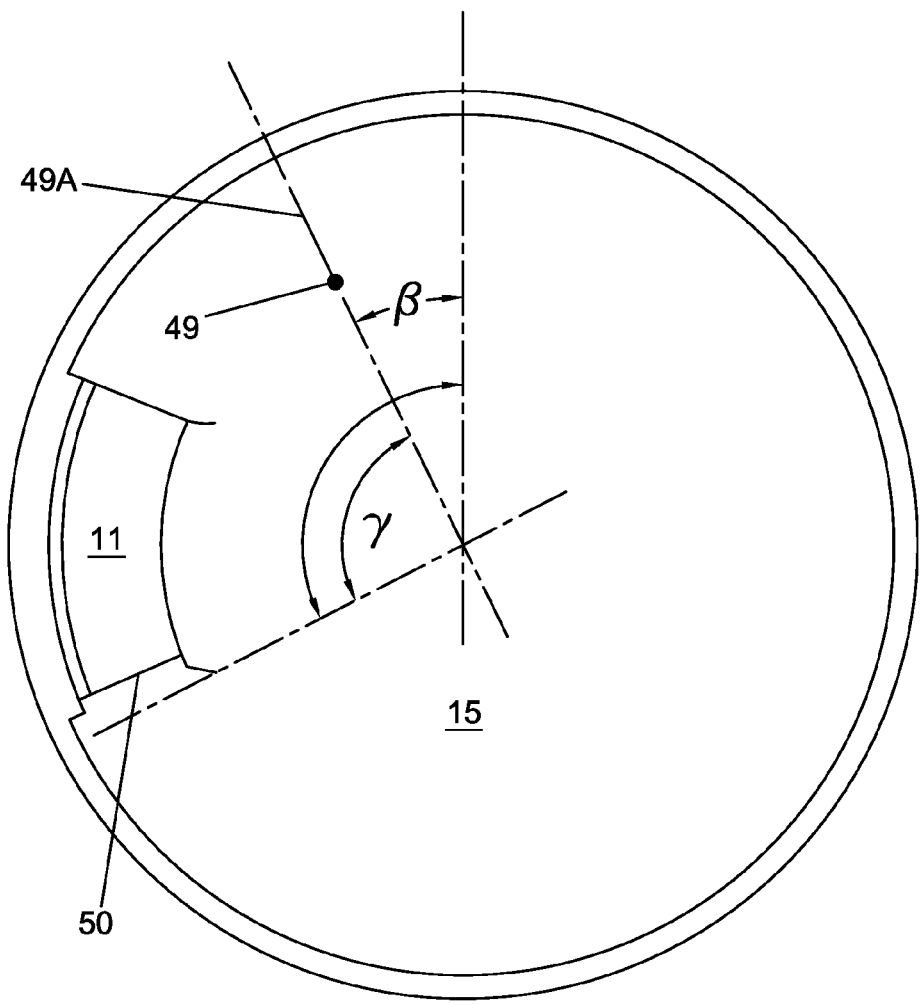
FIG. 19 shows in front view the bottom of the package at an alternative angle of the scoop in dispense position with respect to FIG. 17.

For instance, the dosing edge 49, in a dispense position, extends at an angular distance β of approximately 20 degrees or less, preferably 10 degrees or less, in particular approximately 0 degrees with respect to the vertical. At a larger angular distance β, as shown in FIG. 19, it may be that an excess 53 of beans can be formed, which can result in inaccuracies.

Figure 20:
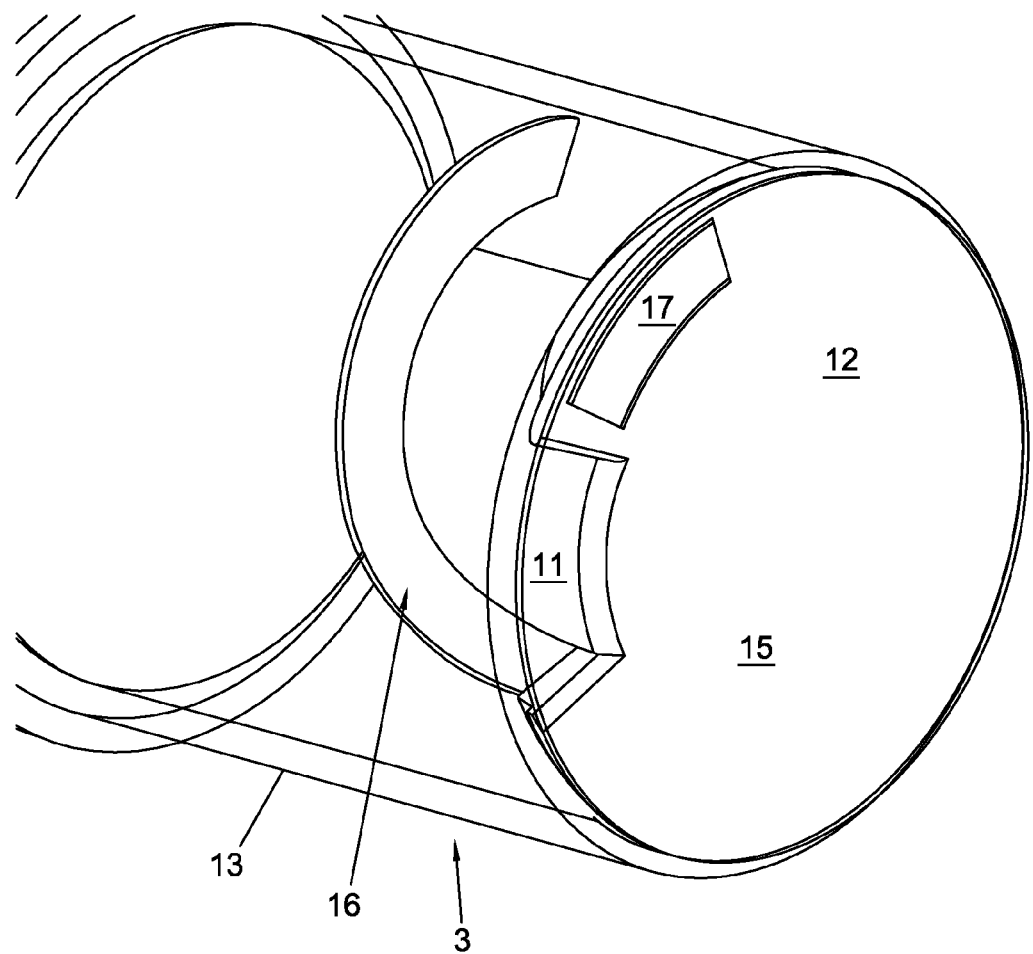
FIG. 20 shows the package with closing means in perspective.

In FIG. 20 a part of the package 3 is shown, wherein a closing means 12 is fastened rotatably or fixedly with respect to the bottom 15. For illustration, the closing means 12 is represented as transparent. The closing means 12 comprises a rotary disc with a passage 17. In the position shown, the passage 17 is positioned at a distance from the outlet 11, so that the outlet is closed. By turning the closing means 12, the passage 17 can overlap and release the outlet 11 for dispensing beans. The closing means 12 and/or the package 3 can for instance be provided with a lock, so that only the apparatus 2 can move the closing means 12 relative to the bottom 15 for releasing the outlet 11. The closing means 12 may for instance be fixed with respect to the bottom 15 and/or the outlet 11 until the lock is opened. Such a principle has already been described hereinabove, for instance with reference to FIGS. 5A, 5B, 6A, 6B and 7.

Figure 22:
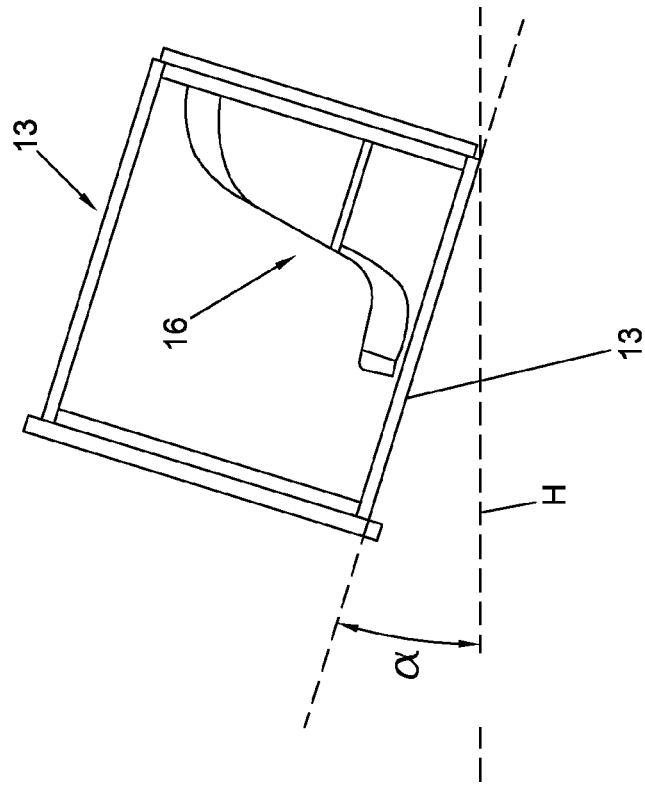
FIG. 22 shows the package according to FIG. 21 at a different angle.
Figure 21:
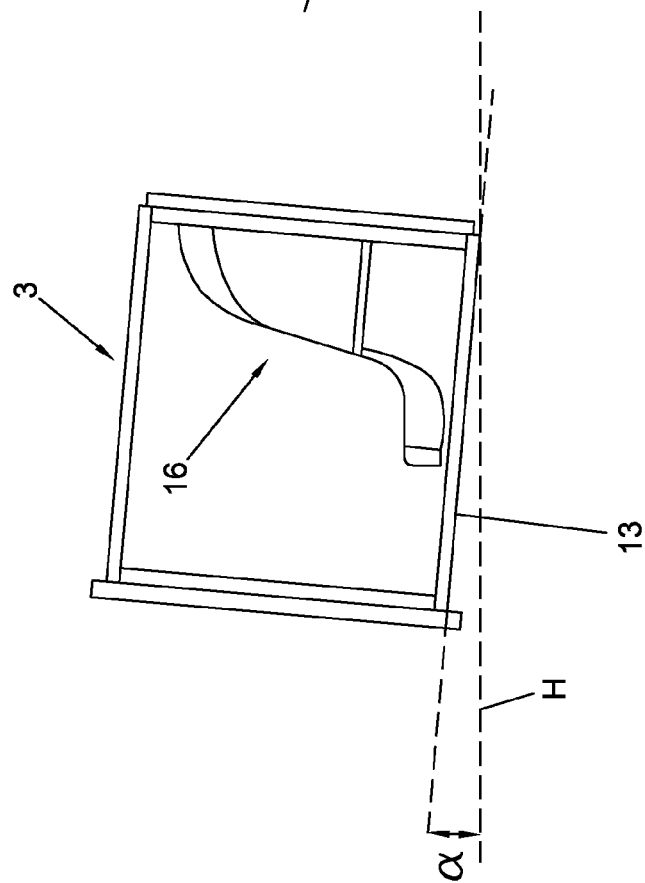
FIG. 21 shows the package in side elevation at an angle.

In an embodiment, the angle α of the rotation axis L and/or circumferential wall 13 with the horizontal H in a connected condition is at least 2 degrees and at most 30 degrees, in particular at least 4 degrees (FIG. 21) and at most approximately 15 degrees (FIG. 22), more particularly approximately 13 degrees. At an angle of approximately 4 degrees or more, the beans can move towards the bottom 15 and/or the scoop 16, depending on the resistance of the circumferential wall 13. At an angle α of 15 degrees or less, preferably 13 degrees, with the horizontal H, the coffee beans can be scooped up relatively easily. At a larger angle α the pressure on the coffee beans in the scoop 16 can increase to such an extent that arching between the beans may occur. Arching may be understood to mean that the beans can be clamped between the walls 19, 20, 15, 13, 52 and against each other, so that the beans do not of their own motion shift further into or out of the scoop 16 anymore.

Figure 23:
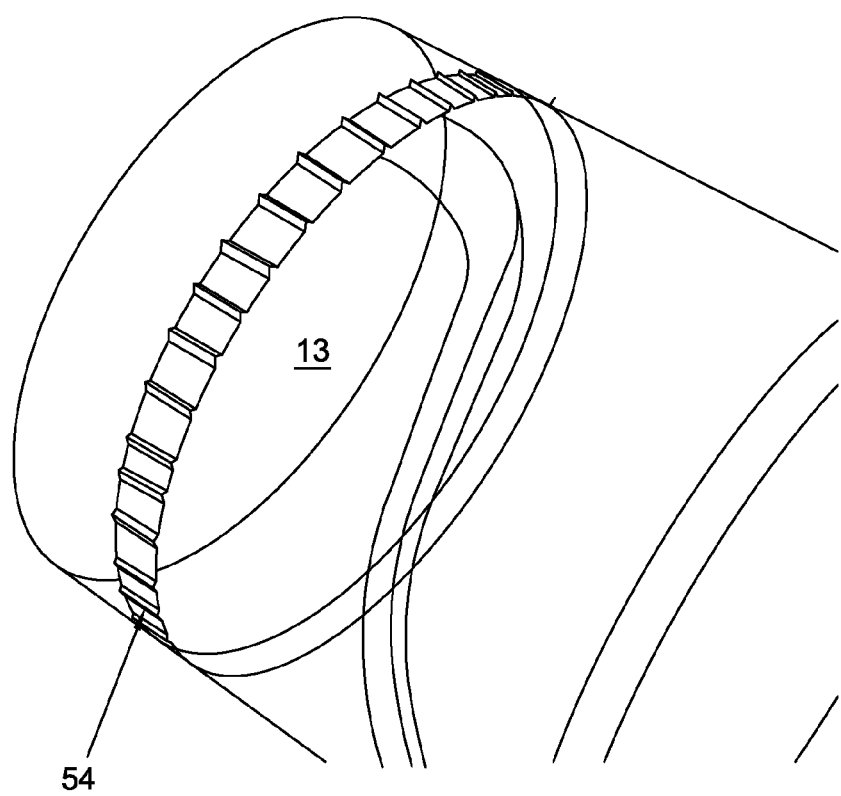
FIG. 23 shows in perspective the circumferential wall with a vibrating element.

Preferably, the system 1 is provided with a vibrating element 54 which is arranged to vibrate the package 3 relative to the apparatus 2, particularly during the rotation of the package 3. Vibrations can stimulate the dosing of coffee beans, the downward shift of coffee beans in the package 3, and/or the filling of beans into the scoop 16. By vibrating the package 3, in particular during rotation but optionally also in the dispense position for preventing an excess 53, arching of beans in the scoop 16 can be prevented. With the vibrating element 54, the filling of the scoop 16 and the dispensing of beans out of the scoop 16 can be done relatively reliably, and/or the system 1 can dose relatively accurately. As shown in FIG. 23, a vibrating element 54 may be provided in the package 3, in particular against the outside of the circumferential wall 13. The vibrating element 54 can comprise a relief, so that the package 3 can be caused to vibrate through rotation. Preferably, the vibrating element 54 is so arranged that the number of vibrations per second is such that arching in the scoop 16 can be prevented. For instance, the vibrating frequency of the vibrating element 54 may be between 4 and 30 vibrations per second, in particular between 8 and 20 vibrations per second, more particularly approximately 14 vibrations per second. The dosing accuracy can then be relatively good. The vibrating frequency may depend on the rotational speed. Also vibration of the scoop 16 during dispensing of beans through the outlet 11 may be favorable, for instance for preventing arching, which could hinder the desired outflow of beans. In particular designs, the vibrating element may be provided in the apparatus and for instance be driven by piezo elements, an electric motor, cams, etc.

In an embodiment, the apparatus 2 is provided with a cover, for instance to close off the connecting device 4, so that the package 3 is surrounded by the connecting device 4 and the cover. For instance a detection system is provided which detects the closed cover and a connected package 3, the detection system being so arranged that it gives a signal to the driving unit of the apparatus 2, the grinder 6 and/or the inlet closure 47, upon detection of connected package 3 and closed cover, so that beans can be dispensed from the package 3 and be ground. This prevents e.g. the package 3 being replenished while connected to the apparatus 2.

In an embodiment, the inner space of coffee bean package 3 when not used before comprises at least 20 grams, more particularly at least 50 grams, still more particularly at least 70 grams and still more particularly at least 200 grams of coffee beans. From this, multiple dosages of coffee beverage can be dosed. Since the coffee making apparatus may be suitable for preparing different kinds of coffee beverage in succession, that is, based on different kinds of coffee beans, it may be favorable to provide coffee bean packages of relatively small volumes. The coffee bean package may be disposable, which may for instance be of benefit to the convenience in use and can keep production costs low. The package can be largely manufactured from environment-friendly disposable, degradable or reusable material, for instance foil, paper or cellulose. In another embodiment, the package may comprise only one dose of coffee beans, so that the system after each connection of the package processes one dose of coffee beans, for preparing a consumption, for instance one cup of coffee beverage. It then holds, for instance, that the inner space when the package has not been used before comprises an amount of coffee beans for preparing one consumption of coffee such as a cup of coffee, preferably about 5-10 grams, more particularly about 6-8 grams of coffee beans.

In an embodiment, the package 3 has a circumferential wall 13 and a bottom 15.

The top wall 14 may for instance comprise a detachable and/or hingeable cover, or may even not be present. In this way, the package 3 can be connected to the apparatus 2 and also be replenished.

In an embodiment where the top wall 14 is present, the package 3, prior to first use, may be filled with a few predetermined doses of coffee beans. Preferably, the package 3 is not completely filled. A part of the inner space can be kept clear, so that the scoop 16 in a dispense position extends at least partly above the level of the collection of coffee beans. In a dispense position the scoop 16 may be loaded with one predetermined dose of coffee beans and extend above a dispense position, near the upper side of the bottom 15 for dispensing the predetermined dose. The scoop 16 and the outlet 11 then preferably extend above the level of the rest of the coffee beans, except for the coffee beans already present in the scoop 16, so that no residual coffee beans are still discharged through the outlet 11. In a dispense position, the package 3 preferably has such an angle of inclination that on the one hand all coffee beans are situated in the lower portion of the package 3, partly against the bottom 15 and partly against the circumferential wall 13, and, on the other hand, the scoop 16 is situated above the level of the coffee beans, except for the coffee beans scooped up by the scoop 16.

The inside of the circumferential wall 13 may be arranged to guide collection of beans in the package 3, in a use position of the package 3, in the direction of the bottom side of the package 3, preferably partly against the bottom 15 and partly against the circumferential wall 13. For instance, the inner side is of relatively smooth design, to prevent any friction between the wall 13 and the beans. For instance, to that end, the inner side is provided with a coating or the like. The inner side of the circumferential wall 13 may further be provided with spiral-shaped paths in the inner wall, so that in a use position the beans are guided downwards. Also the scoop 16 may be arranged to prevent friction, for guiding the beans in the scoop 16 under the influence of gravity through the outlet 11.

In an embodiment, the scoop 16 extends over substantially the full height of the circumferential wall 13, between the bottom 15 and the top wall 14. In this way, all beans can be scooped up from the package 3, also when there is less than a predetermined dose in the package 3, and the last coffee beans are not situated at the very bottom of the package 3.

In an embodiment, the filled package 3 is provided with oxygen-absorbing means, with which, in particular before opening the package 3, contact between the beans and oxygen can at least to some extent be prevented.

In yet another embodiment, the package 3, in particular the wall of the package, comprises pressure-regulating means and/or a valve, to allow gases to be released from the package 3 and/or for preventing an unduly high pressure in the package 3. For instance, at an unduly high pressure in the package 3 gas can be released from the package 3 via the valve, which can prevent deformation of the package 3 due to an unduly high internal pressure.

In yet another embodiment, the package 3 may be provided with multiple scoops 16. For instance, the scoops 16 are arranged in the package 3 at a mutually equal distance, in particular angular distance. For instance, two scoops 16 are situated opposite each other in the package 3, or three scoops 16, each spaced apart from another at an angular distance of approximately 120 degrees.

The variations described and many comparable variations, as well as combinations thereof, are understood to fall within the framework of the invention outlined by the claims. Naturally, different aspects of different embodiments and/or combinations thereof can be combined with each other and interchanged within the framework of the invention. Thus, there should be no limitation to just the embodiments mentioned.

The invention claimed is:

1. A coffee bean package, comprising:
 a package bottom wall;
 a package top wall;
 a circumferential package wall extending from the package bottom wall to the package top wall along an axis such that the package bottom wall and the package top wall both extend perpendicular relative to the axis, wherein a coffee bean dispensing outlet is provided by an opening provided in the package bottom wall;

an inner space defined by the package bottom wall, the package top wall, and the circumferential package wall, the inner space for holding a collection of coffee beans for multiple portions of coffee beverage, wherein the coffee bean dispensing outlet dispenses coffee beans from the inner space, and a coffee bean dosing device, wherein the coffee bean dosing device dispenses a part of the coffee beans from the inner space in a predetermined dose, wherein the coffee bean dosing device comprises a scoop for carrying along a predetermined dose of coffee beans from the collection of coffee beans, the scoop extending from the package bottom wall in the direction of the inner space, the scoop being fixed to the package bottom wall and fixed to the circumferential package wall and extending into the direction of the inner space, wherein the scoop comprises a loading wall extending from the circumferential package wall and a scoop bottom extending from the loading wall to form a trough, the loading wall guiding coffee beans from the scoop through the coffee bean dispensing outlet;

wherein between the scoop and the circumferential package wall a loading opening extends for loading the coffee beans from the collection of coffee beans into the scoop;

wherein the depth of the trough formed by the scoop has a value that is larger than the cross section of the loading opening of the scoop;

wherein the package bottom wall, the circumferential package wall, and the scoop are fixedly connected to each other in position relative to each other such that during rotation of the package about the axis, relative movement between the package bottom wall, the circumferential package wall, and the scoop is prevented and the scoop is moveable through the coffee beans in the inner space from a loading position towards a coffee bean dispensing position;

wherein the loading wall comprises a dosing edge defining an upper surface of the loaded dose of coffee beans, along which an excess of coffee beans falls down in a dispense position of the scoop; and wherein the loading wall extends from the coffee bean dispensing outlet and at least up to the dosing edge of the scoop, along a curve, for guiding the coffee beans from the dosing edge to the coffee bean dispensing outlet.

2. The coffee bean package according to claim 1, wherein the loading wall is provided with an extension extending beyond the dosing edge, the extension forming a carrying wall part for sliding the coffee beans through the loading opening of the scoop.

3. The coffee bean package according to claim 1, wherein the package is provided with closing means for closing off the coffee bean dispensing outlet, so that the coffee bean package is closed off such that escape of coffee beans from the inner space is prevented.

4. The coffee bean package according to claim 3, wherein the closing means are arranged movably relative to the coffee bean dispensing outlet for closing off or releasing the coffee bean dispensing outlet.

5. The coffee bean package according to claim 3, wherein the closing means release the coffee bean dispensing outlet if the scoop is in the dispense position, so that the scoop dispenses the dose of coffee beans through the coffee bean dispensing outlet.

6. The coffee bean package according to claim 5, wherein the closing means close off the coffee bean dispensing outlet if the scoop is in a different position than the dispense position.

7. The coffee bean package according to claim 3, wherein the closing means comprise a valve or slide, provided with a passage, wherein the passage at least partly overlaps with the coffee bean dispensing outlet for releasing the coffee bean outlet, for dispensing the dose of coffee beans.

8. The coffee bean package according to claim 7, wherein the valve or slide comprises a rotary disc for rotating the valve or slide relative to the coffee bean dispensing outlet.

9. The coffee bean package according to claim 8, wherein the package is provided with an engagement element for rotating the valve or slide.

10. The coffee bean package according to claim 1, wherein the circumference of the circumferential package wall is circular for rotating the package in a circular guide.

11. A coffee bean package, comprising:
a package bottom;
a package top wall;
a cylindrical package sidewall extending from the package bottom such that the package bottom and the cylindrical package sidewall define a cylindrical inner space having a longitudinal axis,
an outlet provided an opening in the package bottom, and
a scoop fixedly coupled to the cylindrical package sidewall and fixedly coupled to the package bottom adjacent the outlet and stationary relative to the package bottom and the cylindrical package sidewall, the scoop extending from the package bottom in the direction of the inner space, wherein the package bottom, the cylindrical package sidewall, and the scoop are fixedly connected to each other in position relative to each other such that during movement of the package, relative movement between the package bottom, the cylindrical package sidewall, and the scoop is prevented, and wherein the scoop extends into the direction of the inner space and forms a trough and defines an area to receive a predetermined dose of coffee beans as the package rotates about the longitudinal axis and the scoop moves through coffee beans within the inner space;
wherein the scoop includes a loading wall extending from the cylindrical package sidewall and configured to guide coffee beans from the scoop through the outlet, the loading wall comprising a dosing edge defining an upper surface of the loaded dose of coffee beans, along which an excess of coffee beans falls down in a dispense position of the scoop;
wherein the depth of the scoop is greater than a width of a loading opening of the scoop defined between the scoop and the cylindrical package sidewall; and;
wherein the loading wall extends from the outlet and at least up to the dosing edge, along a curve, for guiding the coffee beans from the dosing edge to the outlet.

* * * * *